United States Patent
Hawver

(10) Patent No.: US 6,574,047 B2
(45) Date of Patent: Jun. 3, 2003

(54) BACKLIT DISPLAY FOR SELECTIVELY ILLUMINATING LENTICULAR IMAGES

(75) Inventor: Jeffery R. Hawver, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/930,691

(22) Filed: Aug. 15, 2001

(65) Prior Publication Data

US 2003/0035220 A1 Feb. 20, 2003

(51) Int. Cl.[7] .................. G02B 27/10; G02F 1/1335; F21V 7/04
(52) U.S. Cl. .................. 359/626; 359/619; 349/62; 362/31
(58) Field of Search .................. 359/619, 621, 359/623, 625, 626, 599; 349/10, 62, 65, 112; 362/31, 32, 302, 309

(56) References Cited

U.S. PATENT DOCUMENTS

| 3,814,513 A | * | 6/1974 | Nims et al. ............... 353/7 |
| 5,392,140 A | * | 2/1995 | Ezra et al. ................ 359/619 |
| 5,465,175 A | * | 11/1995 | Woodgate et al. .......... 359/619 |
| 5,647,151 A | * | 7/1997 | Fantone et al. ............ 40/427 |
| 6,078,424 A | | 6/2000 | Morton |
| 6,104,452 A | * | 8/2000 | Schmutz ................... 349/62 |

* cited by examiner

Primary Examiner—Georgia Epps
Assistant Examiner—Alicia Harrington
(74) Attorney, Agent, or Firm—Nelson Adrian Blish

(57) ABSTRACT

A backlit display device (118) for the automatic viewing of lenticular image cards (62) comprising an illumination source (56) which by design selectively illuminates individual images formed onto lenticular media. The display's illumination source (56) directs light through the lenticule side of the lenticular image card (62) in conformance to the card's viewing distance (54) and selected viewing angle (72) to sequentially illuminate each image in turn.

5 Claims, 21 Drawing Sheets

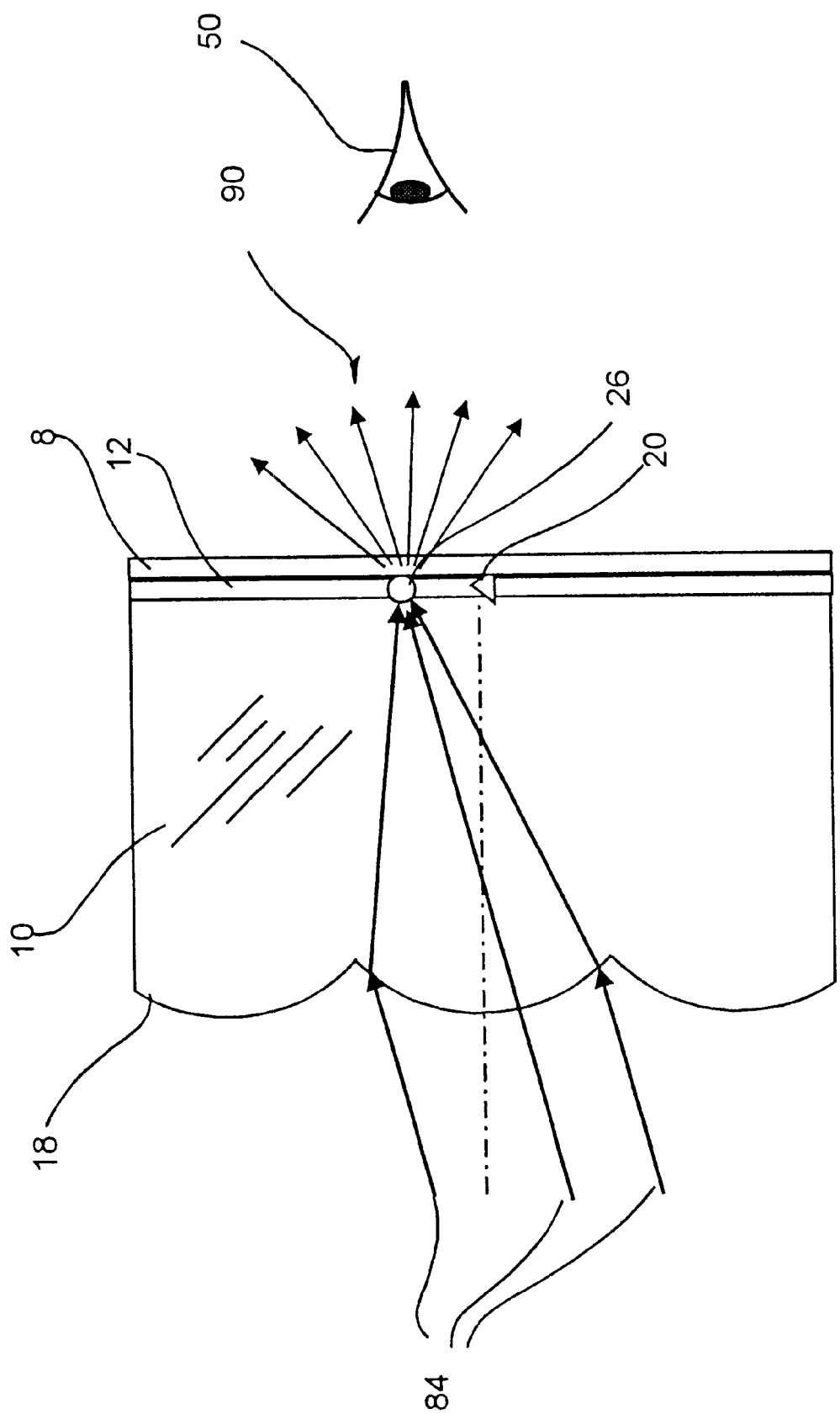

BACKLIT DISPLAY FOR SELECTIVELY ILLUMINATING LENTICULAR IMAGES

FIELD OF THE INVENTION

The invention relates to displaying images formed on an image bearing layer of a lenticular image, and in particular display systems which provide illumination to lenticular images. Specifically, this invention describes a novel backlit display system which provides selective viewing of individual images formed onto an image bearing layer of the lenticular image.

BACKGROUND OF THE INVENTION

The term lenticular image, as used herein, is meant to describe the class of images that are formed on the back side of a lenticular support or substrate and which provide the ability to selectively view at a certain viewing angle a single image from a set of images. The lenticular substrate is a parallel array of cylindrical lenses (or lenticules) made of a suitable clear material which forms the substrate onto which specially formatted image data is applied. This specially formatted image data as described in the art, consists of separate parallel image lines or image views placed behind and along the length of each lenticule. These image view lines are alternatively called lineform or integral image data. Using the high resolution imaging technology available today, there are usually many distinct image view lines arranged in parallel behind each lenticule. As the number of view lines behind each lenticule increases, the spacing between each line must decrease proportionally for a given lenticule size. It is not unusual to have image view line spacing on the order of 12 to 15 microns or less depending on the imaging technology used to generate the images.

The thickness of the lenticular substrate is designed so that when the image data is applied to the back surface of the substrate, the image view lines will be located at the back focal distance of each of the individual lenticules. This allows each image view behind a given lenticule to be seen through the lenticule separately from the other image views as the lenticule is observed at different view angles. This is because the cone of light that emanates off a view line, either from transmittance or reflection, to the lenticule lens surface refracts and forms a mostly parallel ray of light exiting the lenslet at an angle determined by the placement of the view line relative to the lenticule. The width of the parallel rays emerging from the lenticule will have the same width as that of the lenticule and thus the view line's width will be seen magnified to that of the lenticule.

The resolution of a lenticular image, in the direction perpendicular to the lenticules, will always be equal to the pitch of the lenticular array. The actual number of different images that can be seen as the viewing angle changes will be the number of image lines placed behind each lenticule. Of course there will always be a practical limit on exactly how many distinct views can actually be resolved. This limit will be determined by such things as the optical quality of the lenses of the lenticular substrate, the resolution of the media used to form the image lines and the manufacturing tolerance for the thickness of lenticular substrate.

Depending on the content of the original source images and how these source images are formatted and applied to the lenticular array substrate, different lenticular image effects can be produced. If the original image source data contains multiple parallax images of a scene, the data can be formatted onto the lenticular substrate in such a way as to produce an autostereoscopic image. In this instance the lenticules are oriented vertically as a person views the stereo image. Since each eye views the lenticules from different angles, each eye sees different views behind the lenticules and the image appears to have the quality of depth.

Another common use for lenticular imaging is to view motion or dynamic image content. In this case a temporal image sequence, which might be from a video clip, is sampled, formatted and applied to the lenticular substrate. When used in this application the lenticules are oriented horizontally and in this case each eye will see exactly the same view. The lenticular image can then be rotated by hand along the horizontal axis of the image so that the eyes see sequences of image views producing the effect of motion or scene change. A slight variation on this method is to place several different image scenes in sequence together on one lenticular card forming a collage. The images may be thematically related but the individual images themselves are usually different pictures. Thus the images may be scenes relating to a family vacation or perhaps a wedding. The number of individual pictures displayed on this type lenticular card is usually limited to two to four. This is due to the fact that as more pictures are added to the lenticular card each individual picture will be seen over a smaller total viewing angle. This makes it difficult for the person viewing the card to see only one image at a time.

As explained above selective viewing of individual images is accomplished by the cylindrical lenses and the fact that they restrict the view each eyes sees. The changing of views that are visible to each eye is accomplished by changing the viewing angle of the eyes relative to the centerline of the lenticules. This means that either the lenticular media must be rotated or the location of the viewers eye must be physically moved to see the different image views of the lenticular image. Therefore, in actual use, small lenticular cards are usually held in the hand and rotated, while large lenticular images are usually backlit and firmly mounted with the lenticules in the vertical direction, requiring the viewer to walk past the lenticular image.

There are, however, several shortcomings to the above described methods of viewing lenticular images. In the first example, wherein the lenticular image is held in the individual's hand and rotated, it is usually only practical for one person to see the image at one time. This is in contrast to normal photographs which can be viewed by more than one person because there is only one view and everyone can see the same image. With a lenticular image this will not be true and so a second person looking at the lenticular image will usually not see the same image as the person holding the card.

Another problem, especially with lenticular collage images, relates to proper illumination of the lenticular image. Unfortunately, the lenticular effect that allows only one view to be seen at a specific angle also has the same effect with illumination. A directed light source can not illuminate all the views because the lenticules will direct the light to only those views that are at the viewing angle of the light source. If the light source under which the lenticular image is being viewed is at a angle different than the angle of the viewers eyes to the lenticular card the image will appear very dark. The only remedy is to move the viewing orientation of the card until the light source illuminates the same views as those that are being looked at. Usually this will occur when the light source is behind the person viewing the lenticular image.

In the second example above, large lenticular images mounted in some type of frame and perhaps backlit require the observer to physically change their position to see the different views. In this type of display the lenticules are typically oriented in the vertical direction so as the observer walks past the display, different views will be seen. Problems with this type of viewing are that at the point where one view switches to the next, the left and right eye see different views and the image is confusing. Also, it is inconvenient for the person who wants to see a previous view because they are forced to walk back and forth to the correct viewing angle.

U.S. Pat. No. 6,078,424 describes a type of image display device that utilizes lenticular screens. The basic purpose of this display is to allow viewing of what is termed 'image bearing members' that contain the image information. Essentially, the image bearing members are what are typically bonded to the lenticular substrates, or screens in the '424 patent, that allow for correct viewing of lenticular images. However, this image display device has a its own lenticular screen through which the image bearing members that have been formatted for viewing through a lenticular screen are viewed. In one embodiment the lenticular screen is supported on flexures that allow the screen to be accurately translated in a direction parallel to the plane of the screen and perpendicular to the long axis of the lenticules. The difference with this display is that once an image bearing member has been placed into the display, that is behind the lenticular screen, the screen is translated across the image bearing member and thus each successive view can be seen. This is in contrast to a typical lenticular image which would be rotated about the long axis of the lenticular screen. A means is also described to provide for the backlighting of the images to improve viewing in poorly lit environments. The display allows for different image bearing members to be readily changed for the viewing of different images on different image bearing members.

There are difficulties however in the practical realization of this type of lenticular display device due to the extremely precise registration that is required to be held between the lenticular screen and the lenticular images. This precise registration is not only in spacing and flatness between the screen and the images but also in parallelism of lenticules and image lines. The spacing between the lenticular screen and the image bearing member would have to be held to less than 0.0254 mm across the surface of the card. This would require a lenticular screen that could maintain this flatness over its life while being subjected to everyday normal use. In addition, the image bearing members would also have this requirement at least in how flat it would have to be held in the viewer. This type of flatness is difficult if not impossible using plastics for the materials. Another very difficult technical issue is in matching the pitch of the lenticular screen with the images on the image bearing member. The pitch of the lenticular screen of the viewer would have to be held to a tolerance better than 0.1%. The image bearing members produced for this type of display likewise have to maintain this tolerance over temperature and humidity variations.

It is therefore desirable to have a display device capable of sequentially displaying lenticular images automatically that would provide sufficient illumination for the images independent of ambient light conditions. It would also be beneficial to have a display that could be used to display lenticular images which were observable by multiple viewers at the same time from different viewing positions. In addition, it would be desirable to have a display that could selectively display the individual image views of a lenticular image and transition from one image to the next at different rates and in any desired order. Finally, it would be valuable for such a display device that has the capability of displaying lenticular images which are not be limited to a single set of images. Therefore, a display device that has the ability to quickly and easily change from one set of lenticular images to a different set would be extremely useful.

It is one object of this invention to provide a method and apparatus for backlighting lenticular images in a way that selectively illuminates only one of the image views of the lenticular image at a time. It is a further object of this invention to provide a method and apparatus that can change from illuminating any one of the image views of the lenticular image to illuminating a different image view enabling the time sequential viewing of each of the lenticular images without the necessity of moving the lenticular media or the position of the viewers eyes. It is a third object of this invention to provide an apparatus that can be quickly configured to display different sets of lenticular images.

SUMMARY OF THE INVENTION

The present invention is directed towards providing a novel display apparatus for sequentially displaying each of the different image views of a lenticular image where each image view can be automatically illuminated in turn.

According to one aspect of the present invention a method of selectively illuminating one image from a set of images formed on an image bearing layer of a lenticular image comprises the steps of providing a source of illumination which is projected through a lenticule side of the lenticular image. The light passing through the lenticules emanate from a point located at a viewing distance of the lenticular image. Locating the illumination source such that an angle formed by a ray from the illumination source relative to a line at a center of the lenticular image and normal to an image plane corresponds to a correct viewing angle of a first image from the set of images. The illumination is a line source which is parallel to a longitudinal axis of the lenticules.

The display apparatus consists of an illumination source whose light is directed to the lenslet side of the lenticular media. The lenticular image must be of the transmission type wherein the illumination source passes through the image. The illumination source divergence angle is directed such that it conforms to the positional location of the individual image views behind each lenticule. In this way only certain selected image views are illuminated at one time and therefore become visible when viewed from the side opposite of the lenticular substrate. This is the same mechanism that allows the eye to see only certain image views at any one location. By then changing the angle of the illumination source with respect to the lenticules a different image view can be selectively illuminated. A suitable diffuser material is placed on the image side of the lenticular image to diffuse the light coming from the selected view to give it a wider viewing angle.

The invention provides a novel display device for the automatic viewing of lenticular images that does not require either the lenticular image or the viewer to move in relation to each other. Also multiple viewers will see the same image even though their positions relative to the lenticular media may be different.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 9 illustrates the use of a diffusive layer on the image bearing layer to enhance the ability to view image views from the back of the lenticular image;

To facilitate understanding, identical reference numerals have been used, where possible, to designate identical elements that are common to the figures.

DETAILED DESCRIPTION OF THE INVENTION

The following detailed discussion will initially describe the prior art of lenticular images and the mechanism behind the lenticular images ability to selectively view different image views. This discussion will be useful in explaining how a selective backlit display can be devised using this mechanism. This will be understood clearly by examining FIGS. 1–5.

Figure 1:
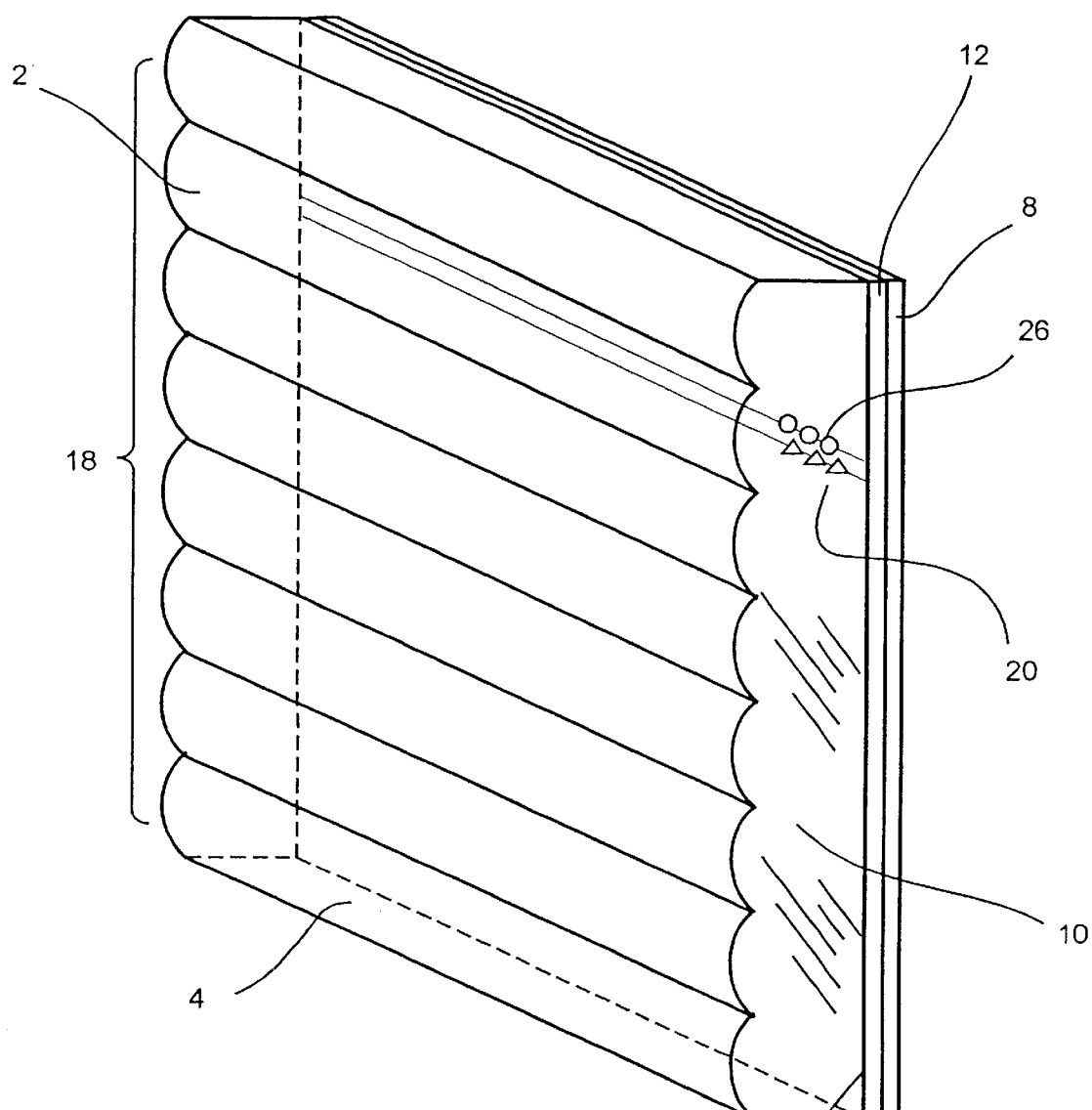
FIG. 1 is a perspective view of a typical, prior art lenticular image card.

FIG. 1 is a depiction of the typical construction of a lenticular image with clear lenticular substrate 10, having a back surface 6 and a front surface 4 wherein a parallel array of cylinder lenses or lenticules lenses 18 have been formed. The curvature of the lenticules and the thickness of the substrate is such that the flat back surface 6 is at the focal distance of the lenses. Onto the back surface 6, is applied an image bearing layer 12 which contains the specially formatted image data. The image data behind lenticule 2, is partially shown for simplicity as two parallel lines of image points 20 and 26, the different image content represented as triangles and circles. In reality every lenticule will have multiple image view lines formed behind it on the image bearing layer. The image bearing layer must be accurately registered with the lenticular array both in parallelism and position in order for the lenticular image to appear correctly. Depending on the type of image bearing layer 12, there may also be a diffusive reflective layer 8 laminated to the image bearing layer. This diffusive reflective layer 8 is provided to reflect light directed from the lenticule side back out so the images can be viewed from the front. Alternately, some lenticular image cards are viewed in a transmissive mode, where the diffusive reflective layer 8 does not reflect but transmits and diffuses light from a source coming from behind.

Figure 2A:
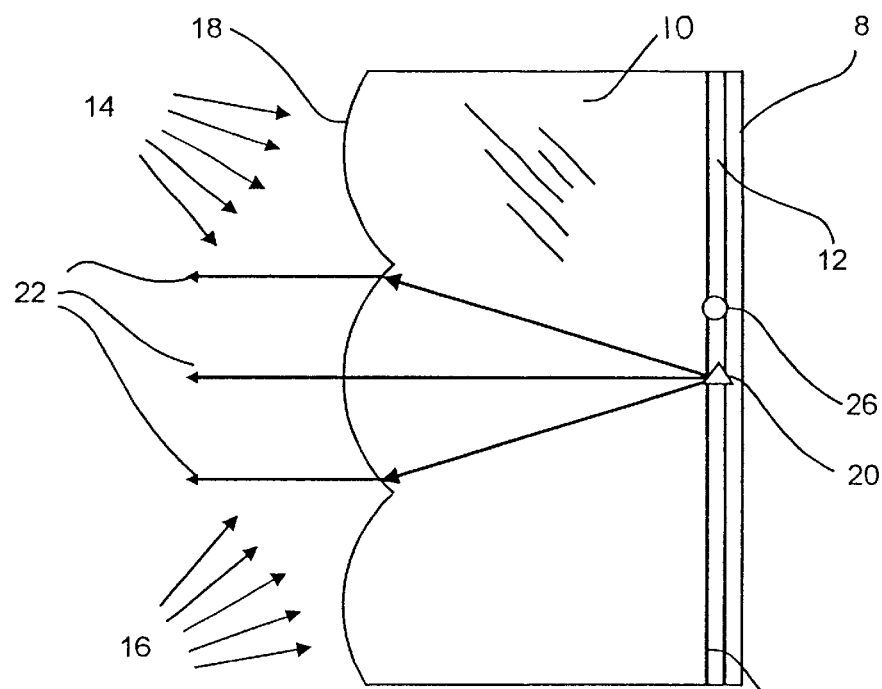
FIGS. 2A and 2B are schematic views illustrating how the lenticules provide selective image viewing allowing only one image view to be observed from a particular viewing angle.

FIG. 2A depicts a side view of lenticular substrate 10, with an array of lenticular lenses 18. Only three lenses are shown. When diffuse ambient illumination sources 14 and 16, in front of the lenticules passes through the lenses and clear substrate, it illuminates the image bearing layer 12 on the back surface 6 of the lenticular substrate 10. A cone of illumination will then reflect off diffusive reflective layer 8 and image point 20 of the image bearing layer 12 and back out through the lens. However, because the image layer is at the focal distance of each lenticule, the light cone coming from any spot on the image layer, will emerge as a collimated beam 22 from the surface of the lens. The exact angle of the collimated beam with respect to the center line of the lenticules depends on the location of the image spot relative to the center of the lens through which the light is transmitted. In FIG. 2A, image point 20 is located exactly on the center line of the lens and so the collimated beam emerges parallel to the center axis of the lens.

Figure 2B:
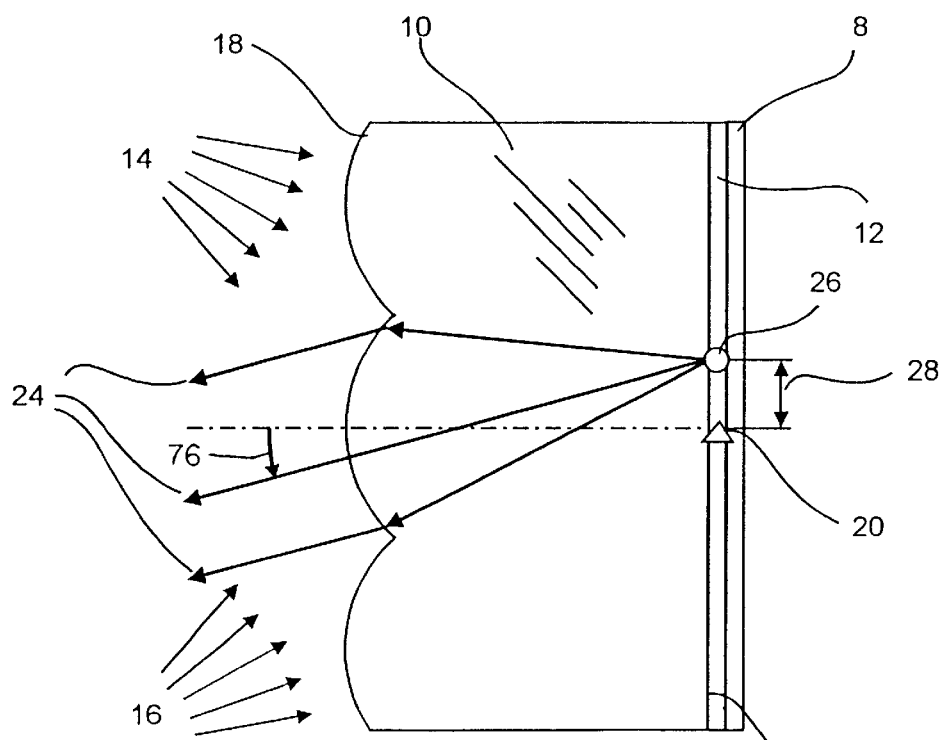

FIG. 2B depicts a different image point 26, which is at a distance 28 above the lens central axis. Because of this, the cone of light from image point 26, emerges from the lenticule at an angle 76, with respect to the lens central axis. Hence, it can readily been seen that image points 20 and 26 can be viewed through the same lenticule but at different view angles. When a viewer's eye is looking at a lenticular image, the particular image spot visible to the eye depends upon the angle of the eye's viewpoint with respect to the center line of the lenticular media. The ability of lenticular images to selectively see different image views at different viewing angles produces all the image effects such as autostereoscopic 3D, motion and collages. Discussions from this point on will focus on the type of lenticular images where the images are viewed with the lenticules oriented in the horizontal direction since this is the type of images that can be displayed with this invention.

Figure 3:
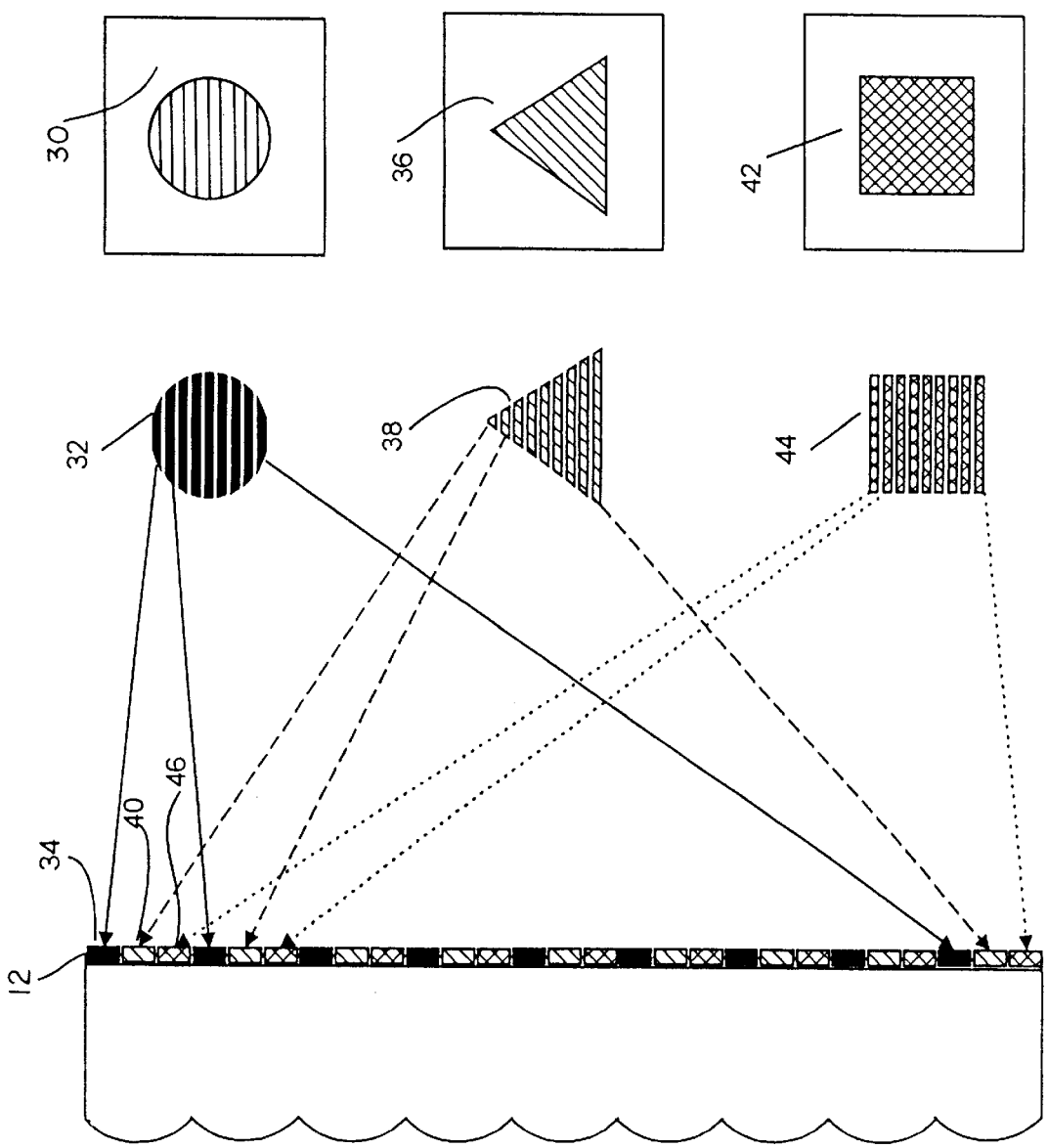
FIG. 3 is a diagrammatic view of the process of formatting image information from source pictures to be placed onto the image layer.

FIG. 3 schematically represents how image data needs to be formatted behind each of the lenticules to produce a collage effect. In the Figure there are three different source images consisting of a circle 30, a triangle 36 and a square 42. Each of these images has to be sampled in the vertical direction at the resolution of the final lenticular image. Since there are a total of nine lenticules on the media each image must be sampled to form lineform images of 9 lines. The source images are shown sampled to the left of the original images as circle 32, triangle 38 and square 44. The image sampling in the horizontal direction can be at a different resolution and is typically much higher. The sampling process is usually done today using digital scanning and image processing techniques to produce the lineform images. Once the three images have been sampled they then have to be formed into one composite image file to be printed onto the image bearing layer 12. This is done by interlacing the individual lines from each image. Since there are three source images there will be three image view lines behind each lenticule. The image data is then formatted so that the first line of each image is placed behind the first lenticule. As shown in FIG. 3, line one of circle image data 32 is placed behind the first lenticule at image location 34. Line one of the second triangle image data 38 is placed behind the first lenticule at location 40, and line one of the third square image data 44 is placed behind the first lenticule at location 46.

The second line of each image is then interlaced so that they fall behind the second lenticule. This is continued until all image lines from each source image have been interlaced.

As shown in FIG. 3, all image view lines from top to bottom are placed exactly behind each lenticule. In fact if the image data is applied to the lenticules in this way a problem will exist for the viewer looking at the images through the lenticules. The problem is that the viewer will not be able to see any one view completely at a given position. This is because all parallel rays emerging from the image view lines from one image will not converge to the viewer's eye position. However, the image views can be made to converge by spacing the image view lines at a pitch slightly lower than the pitch of the lenticules. Increasing the magnification of the image data in the vertical direction causes the image data to be slightly longer than the lenticular media. This produces a convergence of image view lines to a specified point and is termed the viewing distance of the lenticular image.

Figure 4:
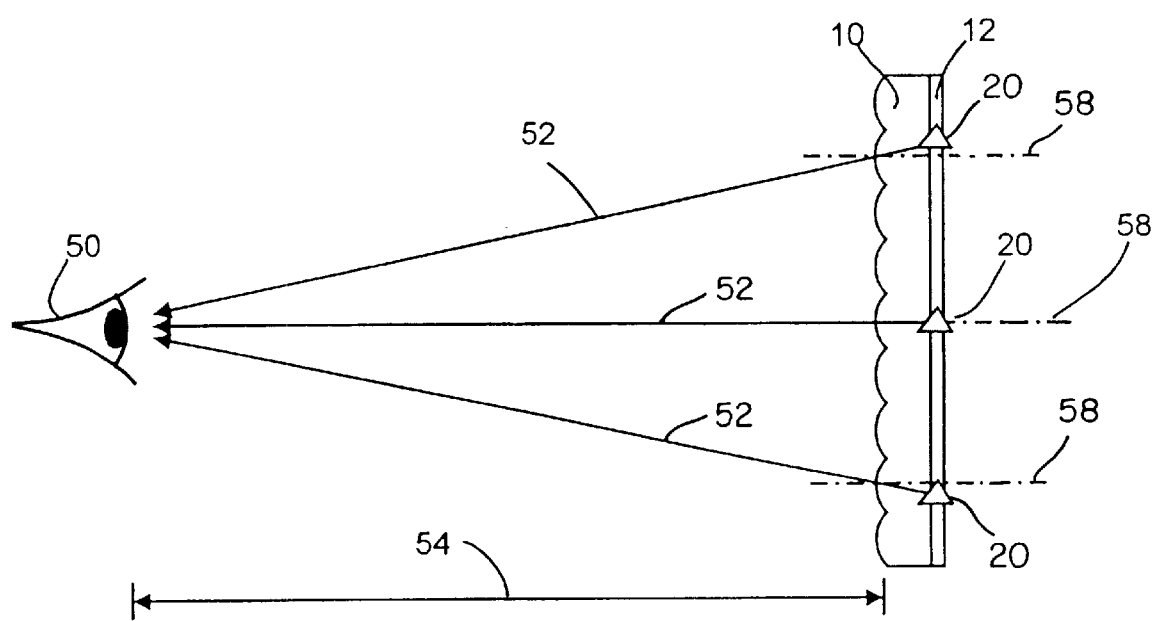
FIG. 4 is a schematic view illustrating how the viewing distance of a lenticular image is defined.

This is illustrated clearly in FIG. 4 which shows the rays 52 of the image views of the center image of triangle 20 converging to the viewer's eye 50 at the viewing distance 54 of the lenticular image. This convergence is caused by the fact that the image view lines are displaced from being centered on lenticule center lines 58 as the distance of the image view lines get farther from the lenticular image center.

Figure 5A:
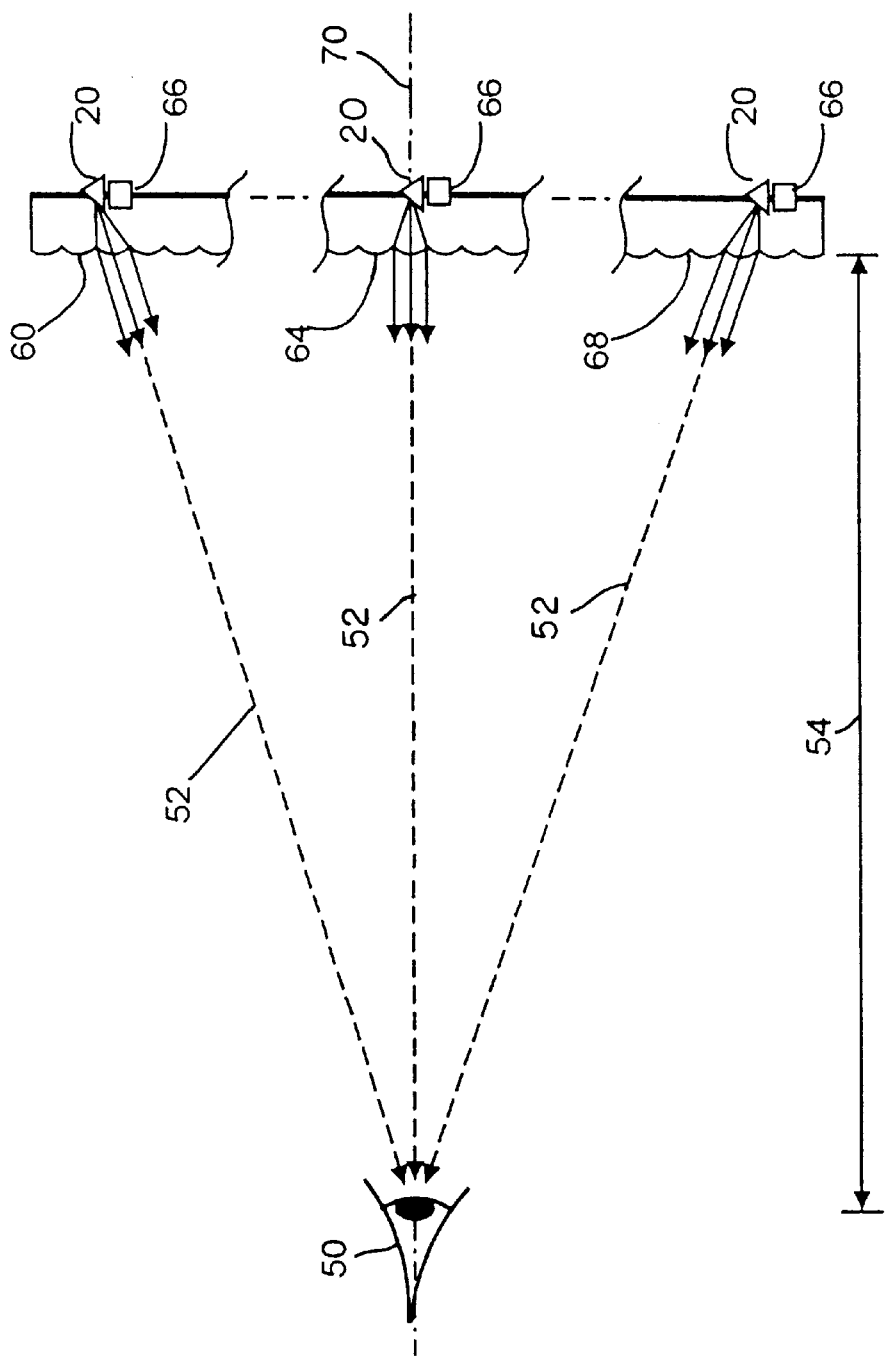
FIGS. 5A and 5B illustrate how different images can be observed through the same lenticules at the same viewing distance but at different viewing angles.
Figure 5B:
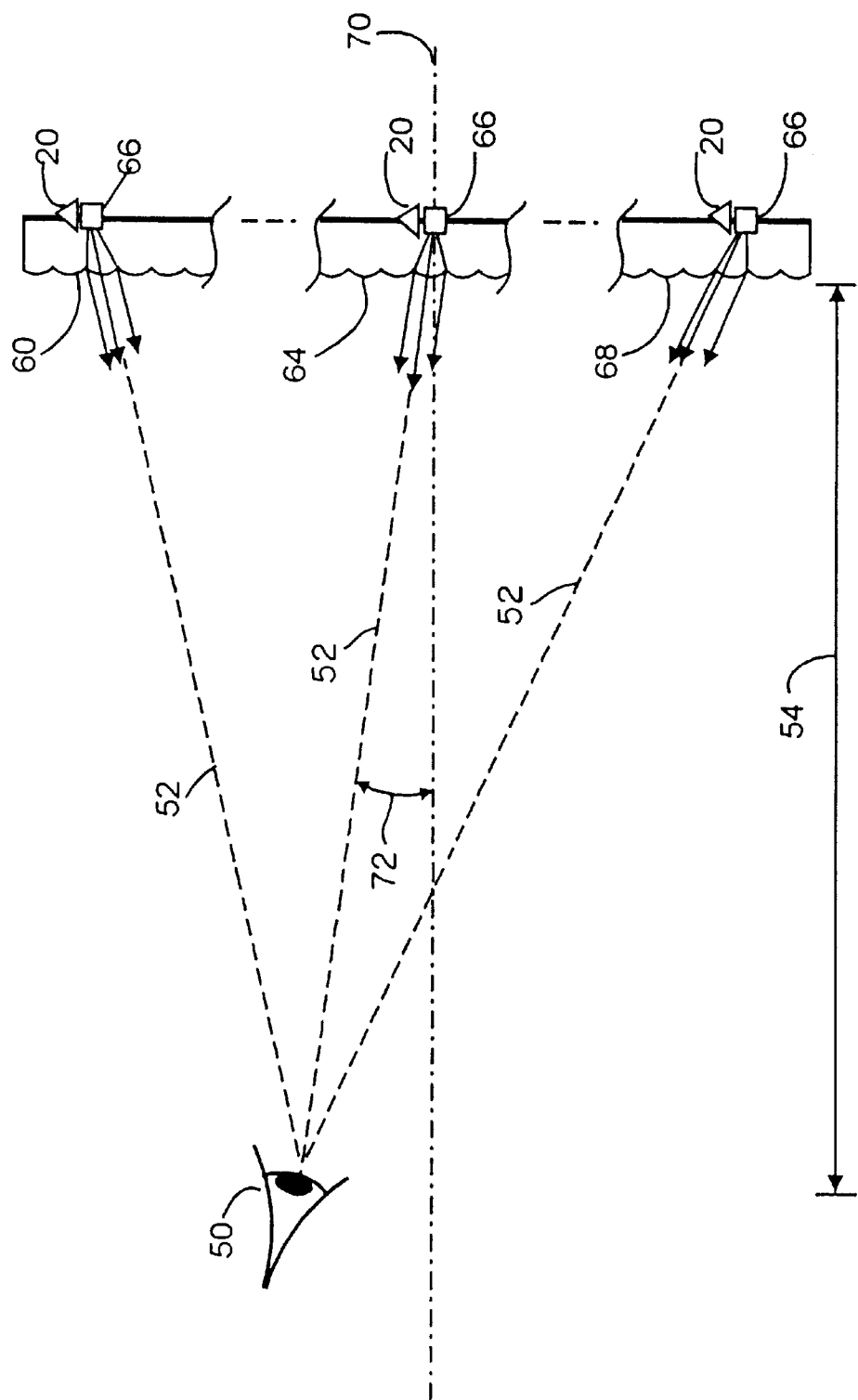

FIGS. 5A and 5B demonstrate how the rays from the image views of different pictures are made to converge to the viewer's eye at different viewing angles and at the correct viewing distance. FIG. 5A shows the viewer's eye 50 with a viewing angle parallel to the lenticular image center line 70. The lenticular image card is shown sectioned into three parts: the upper 60, middle 64 and lower 68 sections. Each section is shown figuratively with two different image views consisting of triangular image point 20 and square image data 66 behind one lenticule. In reality, all the lenticules will have image data behind them. This was done to simplify the figures and explanatory text.

From this view all the rays from the triangle image point 20 on each section will converge at the viewer's eye 50 and the image of the triangle will be visible across the whole lenticular card. When the viewer's eye position is changed to that of FIG. 5B, the viewing angle is no longer parallel to the lenticular image center line 70. This different viewing angle 72, will be at the position where all the image view lines of the square image data 66 converge. Thus the image of the square will be visible across the whole card at this viewing location. Therefore, two completely different pictures are readily viewable through the same lenticules when viewed at different viewing angles.

Figure 6A:
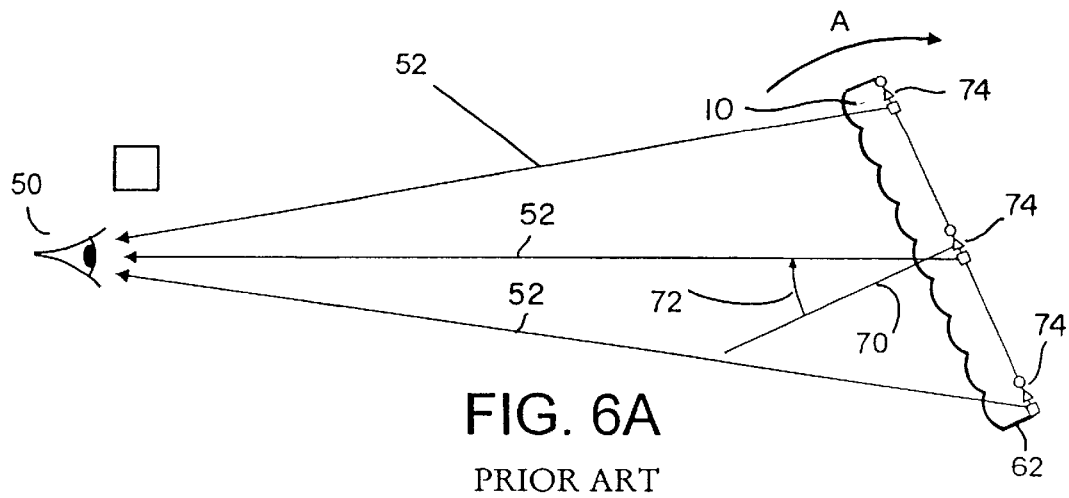
FIGS. 6A, 6B and 6C show how lenticular images that have the image effects of motion or collage images are viewed.
Figure 6B:
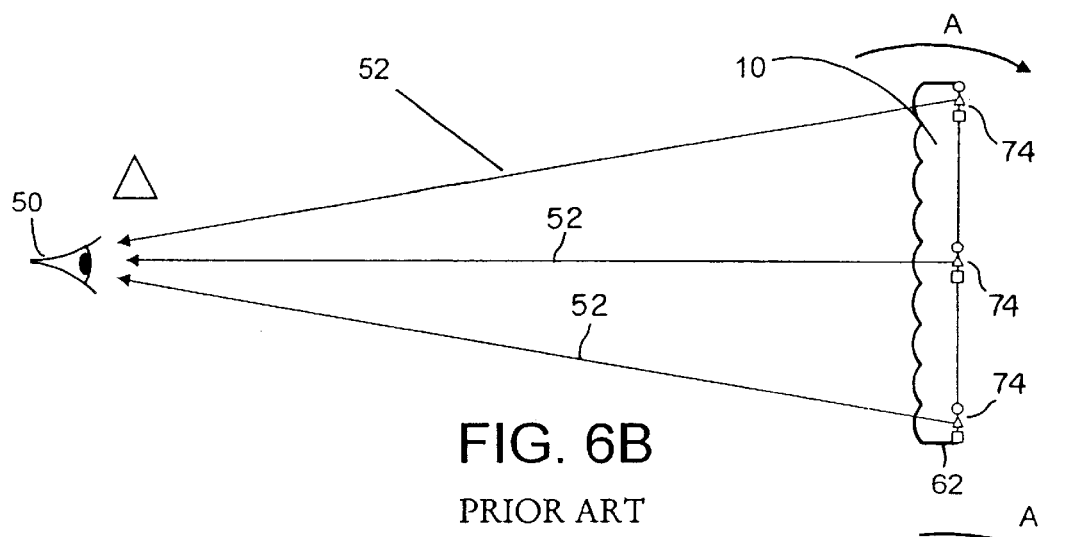
Figure 6C:
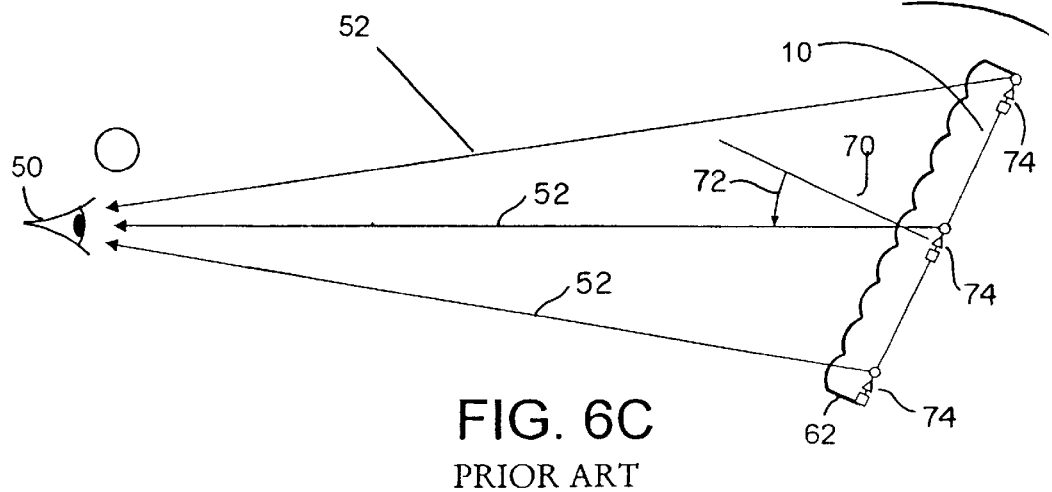

In actual use the smaller lenticular images using the collage or multiple image effect are typically viewed with the viewer's position remaining constant and the lenticular card itself rotated to see each of the pictures. As shown in FIGS. 6A, 6B and 6C, a lenticular image card 62 is rotated in direction A in front of the viewer's eye 50. At each of the different positions shown in FIGS. 6A, 6B and 6C, a different set of image views 74 located on the image bearing layer will become visible as rays 52 converge to the viewer's eye 50. As the card is rotated, a new viewing angle 72, is generated and the rays 52 of different image view lines converge to the viewer's eye 50.

This detailed discussion of the prior art has clearly demonstrated the mechanism of how lenticular images are capable of providing multiple image views and how they are typically displayed. Now a detailed discussion will be provided to describe how a display viewer can use this same mechanism to selectively illuminate different image views.

Figure 7A:
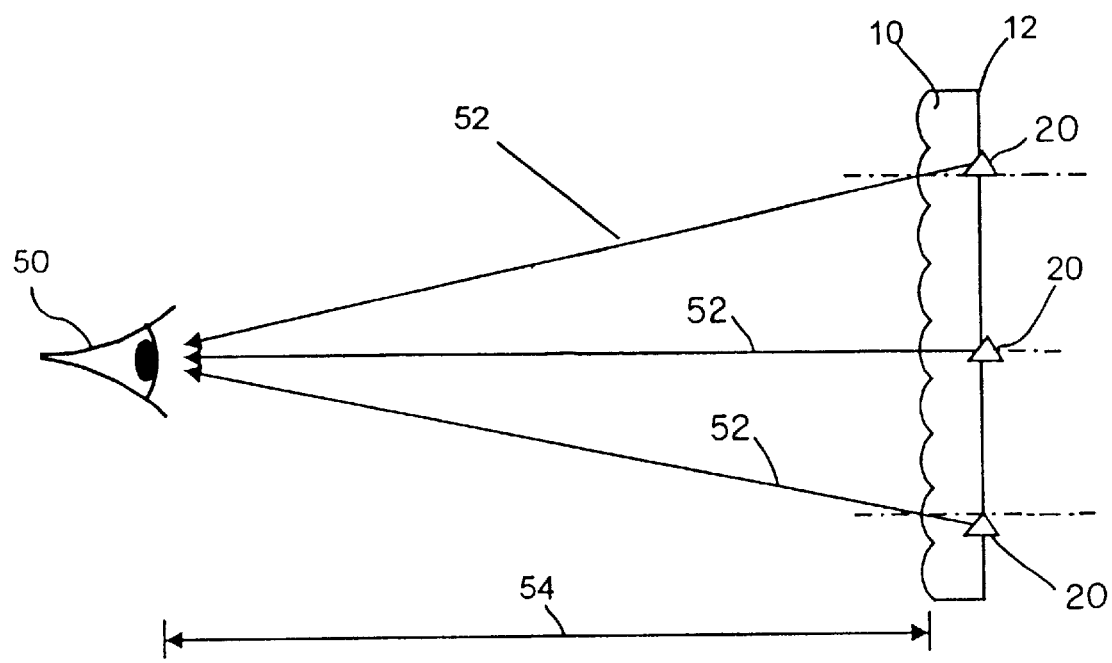
FIGS. 7A and 7B demonstrate how the observer's eye can be replaced with an illumination source to illuminate a single image view.
Figure 7B:
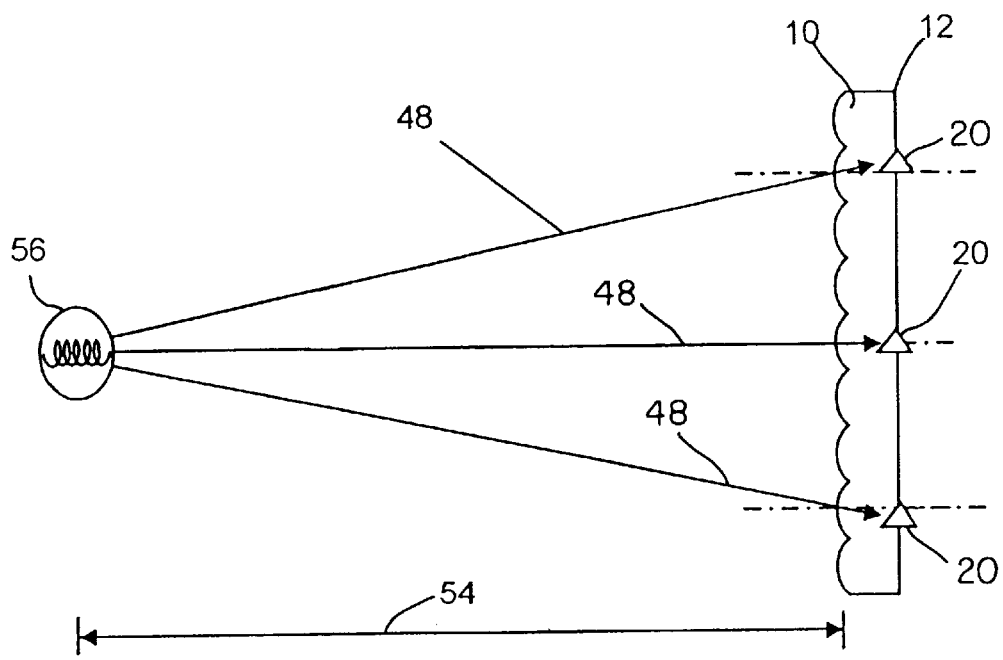

FIG. 7A is the same as FIG. 4, which was used to show how the rays 52 of image points 20 converge to the viewer's eye 50. If the viewer's eye 50 is replaced with a point source of illumination 56 as shown in FIG. 7B, the rays emanating from illumination source 56 diverge to enter the lenticules of lenticular substrate 10. It can clearly be seen that these rays have a divergence angle that is the same as the convergence angle in FIG. 7A. Therefore, the illumination from illumination source 56 after passing through the lenticules will illuminate the image view points 20 on the image bearing layer. This useful feature can be used to selectively illuminate a set of view lines belonging to only one picture which as shown in the Figure would be image data of the triangle.

Figure 8A:
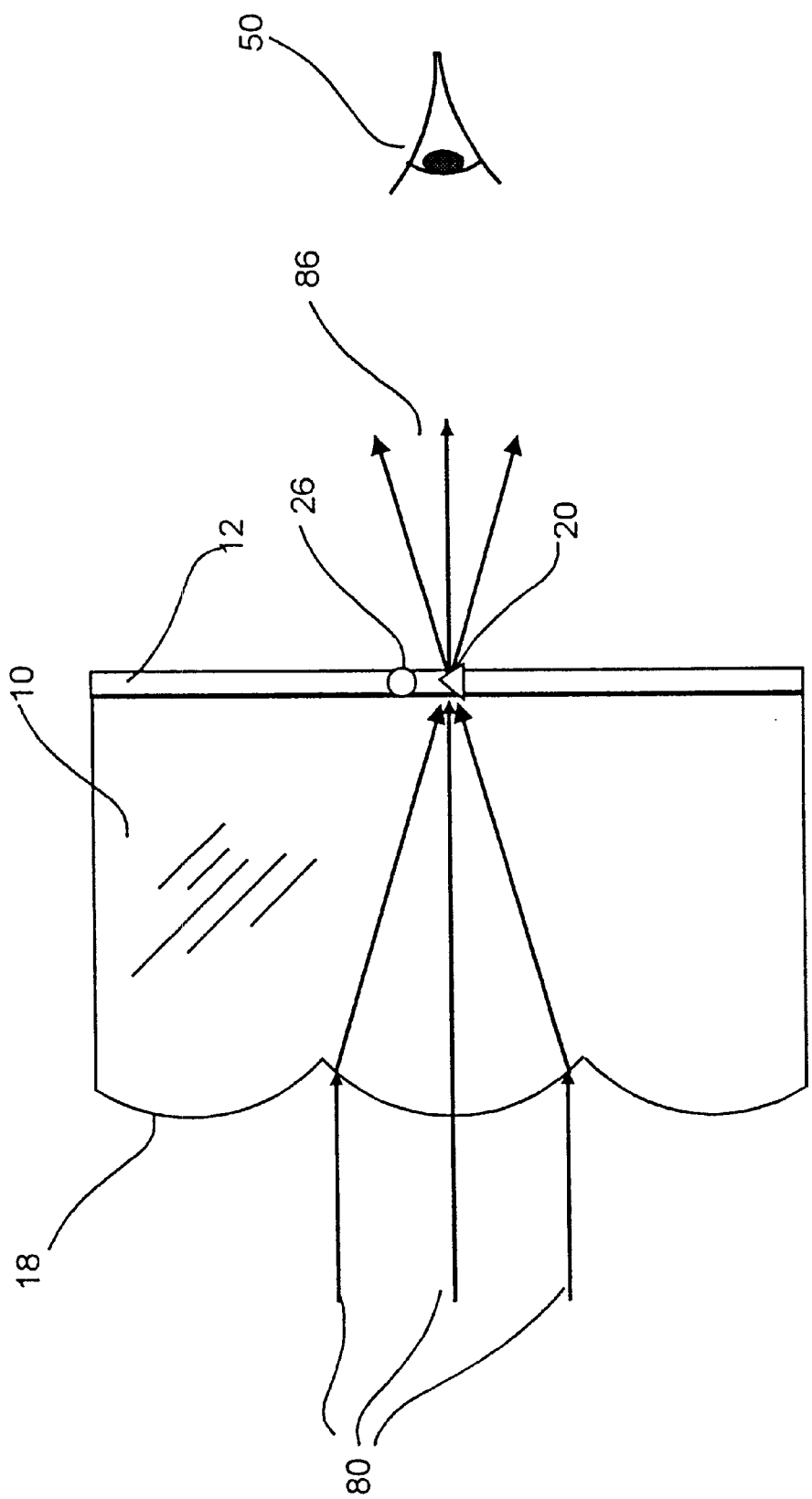
FIGS. 8A and 8B are schematic views demonstrating how an observer viewing the lenticular image from the back side can see individual image views that are illuminated by an illumination source through the lenticules.
Figure 8B:
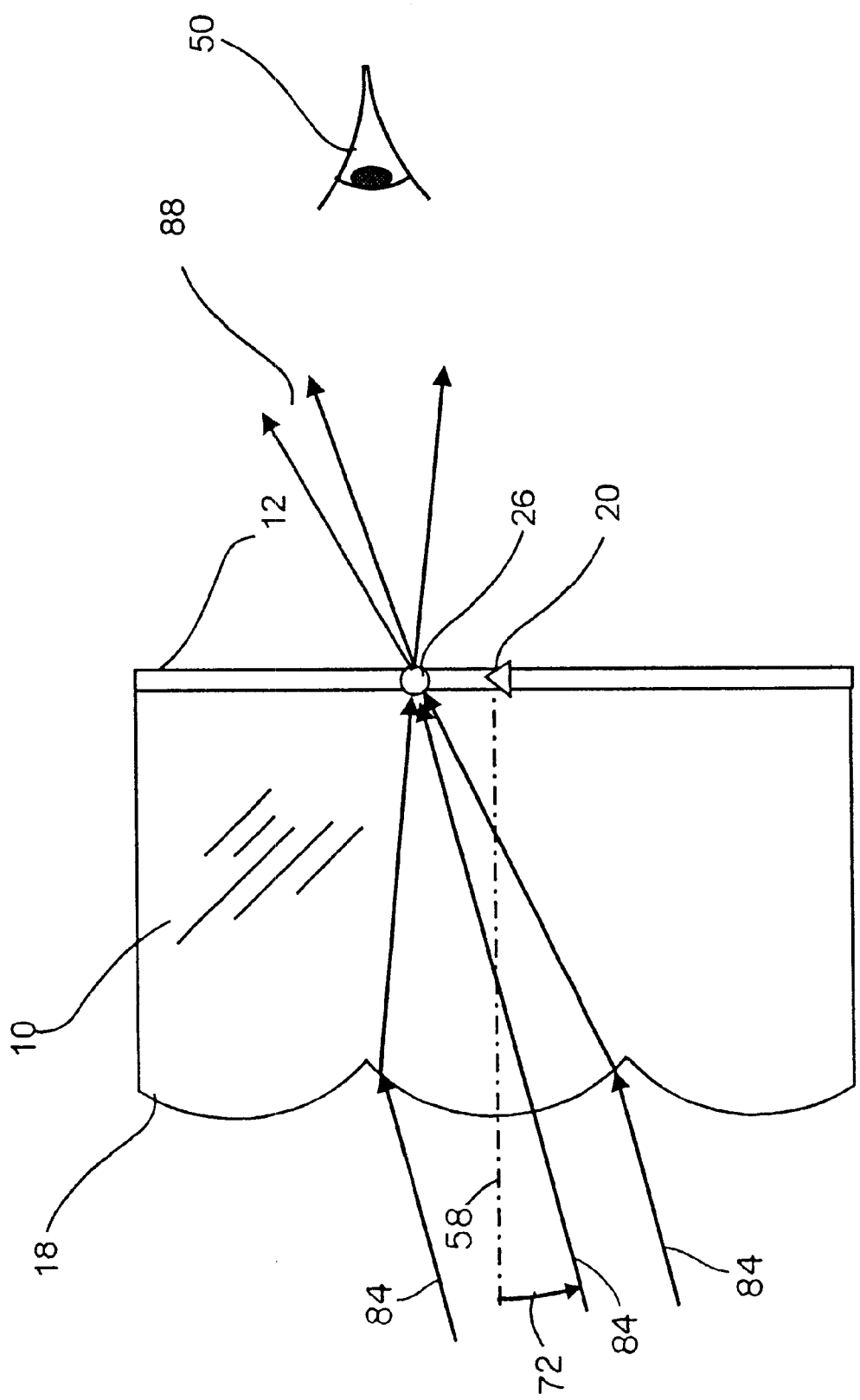

FIGS. 8A and 8B show in detail how two separate image views belonging to two separate pictures can be selectively illuminated by changing the angle of the source illumination relative to the center line of the lenticular image. In FIG. 8A rays 80 from an illumination source enter the lenticular side of the lenticular substrate and converge to image point 20 on the image bearing layer 12. Image bearing layer 12 being a of the transmissive type, allows rays 80 from an illumination source to pass through image point 20 as divergent rays 86 to be observed by viewer's eye 50. Since the rays 80 from an illumination source enter the lenticule at a specific angle they do not provide illumination for image spot 26. Hence, the image seen by viewer's eye 50 will be exclusively from image spot 20. As a consequence of viewing the image from the back instead of through the lenticules, the image data on the image bearing layer 12 must be reversed left to right in order to keep the correct orientation for the viewer.

In FIG. 8B rays 84 from an illumination source provides a different angle of viewing 72 that enters lenticular lenses 18. The rays after entering a lenticule converge to image point 26 providing illumination exclusively to it. After passing through image point 26 the emerging divergent rays 88 are observed by viewer's eye 50. Thus by changing the angle of illumination through the lenticules different image views can be selectively viewed by an observer looking at the lenticular image from the back side.

FIG. 9 shows an additional diffusive reflective layer 8 that can be added after the image bearing layer 12 to diffuse the emerging rays 90. Since the cone of illumination that converges to the image bearing layer is quite narrow the diffusive reflective layer 8 acts to increase the angle over which the image spot 26 can be observed without intensity falloff. Additionally, this diffusive layer also acts as a protective layer to prevent scratches to image bearing layer 12.

Figure 10A:
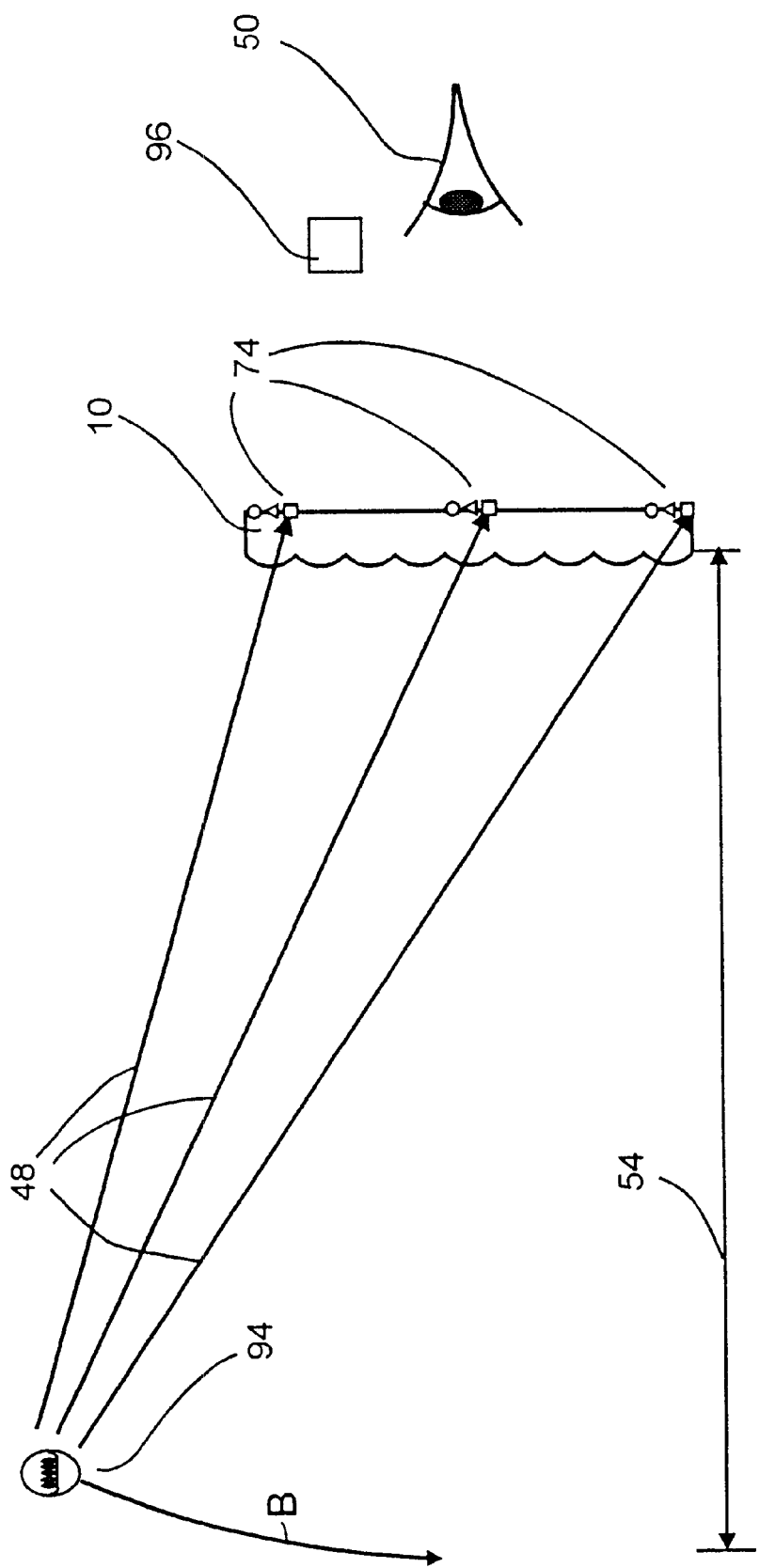
FIGS. 10A, 10B and 10C illustrate a method for selectively illuminating the individual image views using a moving illumination source.
Figure 10B:
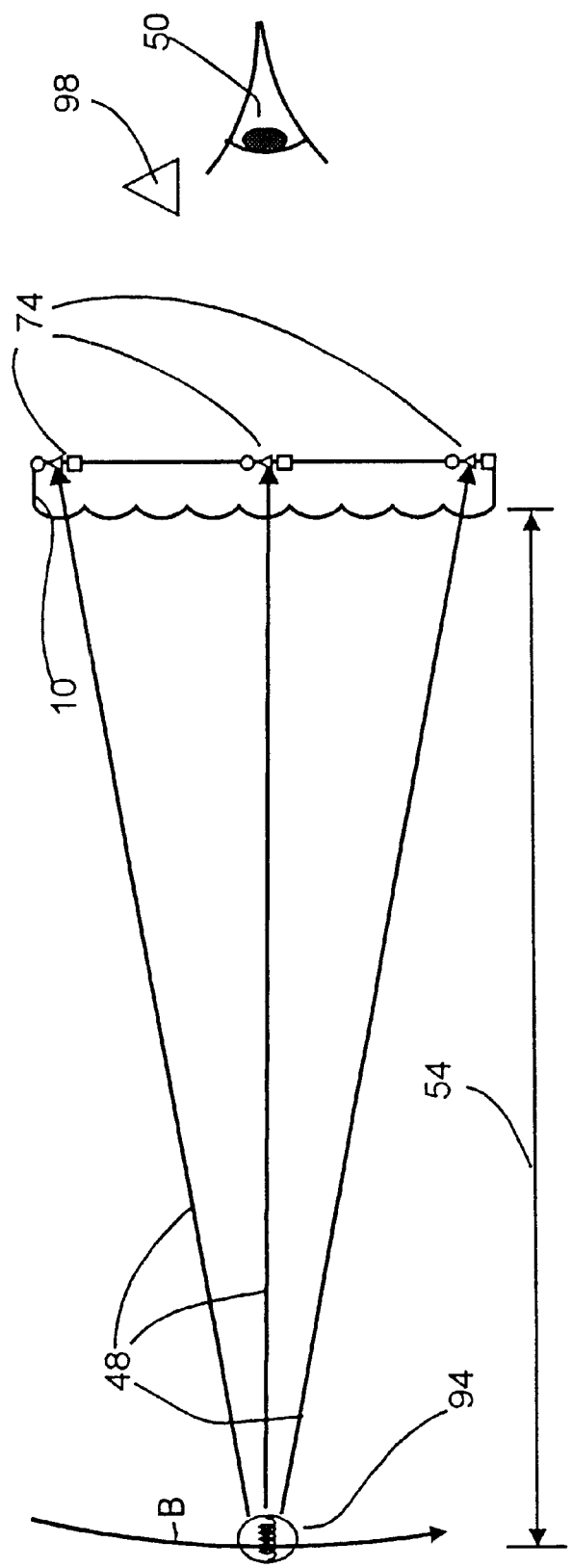
Figure 10C:
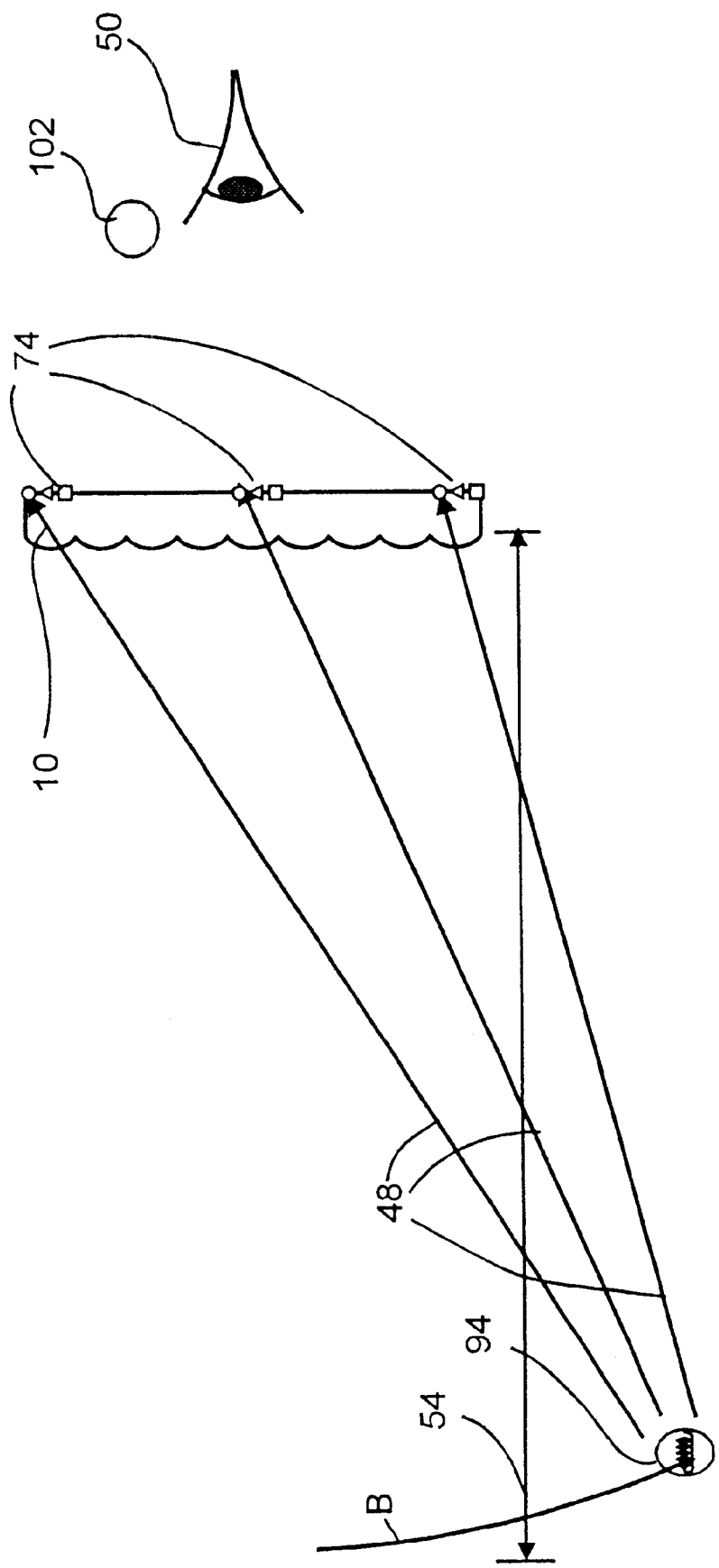

FIGS. 10A, 10B and 10C illustrate how a lenticular image display can be configured to illuminate each image view individually for the a person viewing the images. The basic mechanism consists of the illumination source 94 which is positioned at the viewing distance and is made to move through an angle in the direction of arrow B, as shown in FIGS. 10A, 10B and 10C. The lenticular image has three different pictures and the image view 74 consists of a square, triangle and circle image data as figuratively shown. In fact the image data exists behind each of the lenticules, but for clarity is only shown behind three. The viewer's eye 50, views the lenticular image from the side opposite the illumination source. As the position of illumination source 94 is moved in the direction of arrow B the observer's eye will see each of the pictures on the lenticular image in sequence, that is the square 96, the triangle 98 and the circle 102. The particular advantage of this being that the observers eye does not have to change its viewing position. Additionally, if more than one observer is looking at the display they will both simultaneously see the same image.

Figure 11:
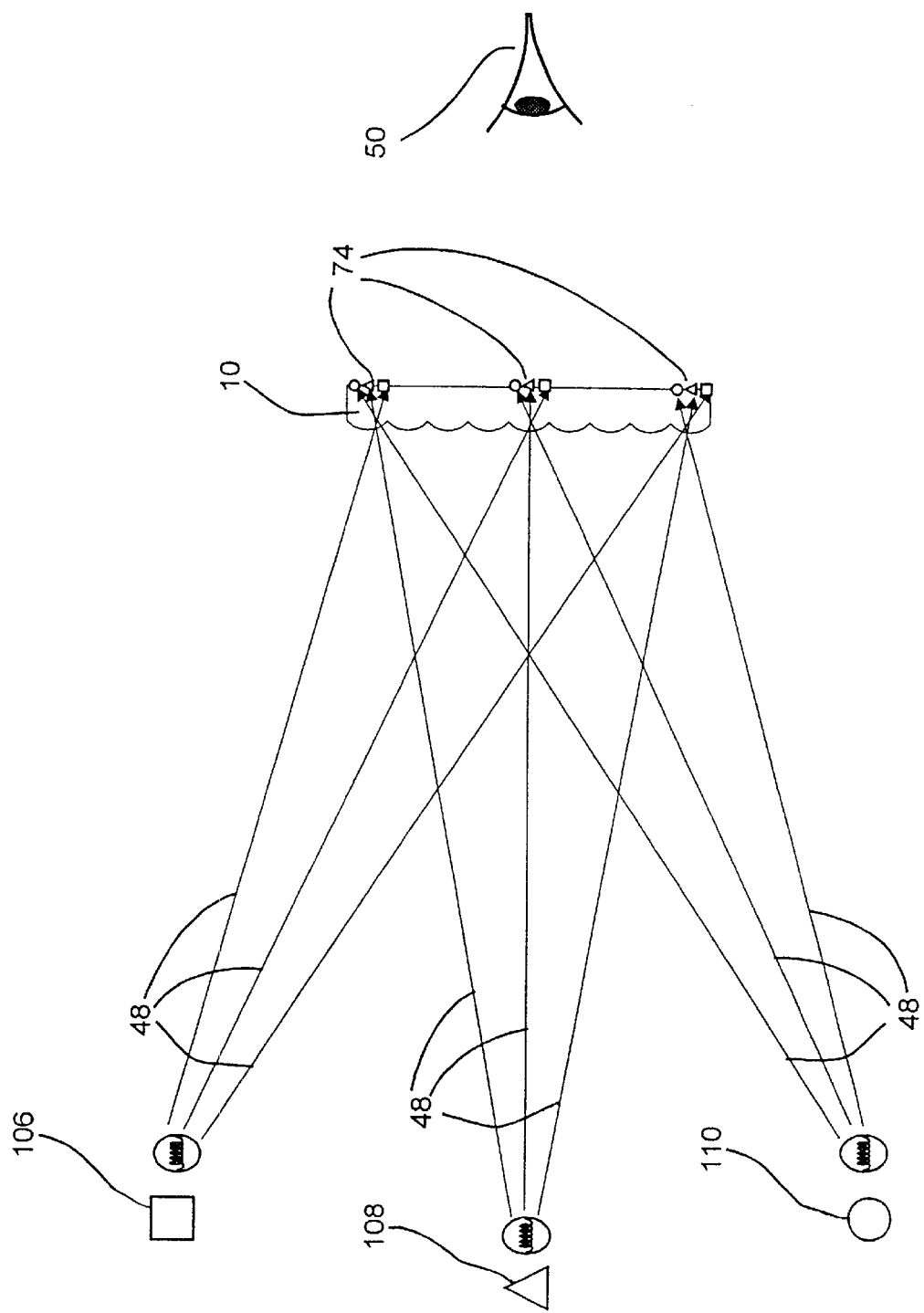
FIG. 11 shows another method useful for the selective illumination of individual image views.

An alternate method is shown in FIG. 11, where instead of moving the light source through different viewing angles, individual illumination sources are positioned at the different viewing angles. As shown in FIG. 11 there are three individual illumination sources at the viewing angles for the square 106, the triangle 108 and the circle 110. As each illumination source is individually turned on the image view associated with that viewing angle will be illuminated and become visible to the viewer's eye 50 at the opposite side of the lenticular image card. This method has the desirable feature that any one of the three image views can be illuminated in any order desired by turning on the illumination source associated with that particular view. Another desirable feature is that by gradually dropping the intensity of one illumination source while raising another, the effect of an image dissolve can be produced from any one image to any other.

The discussion up to this point has limited the number of views on the lenticular image to three. This was to provide consistency throughout the discussion for purpose of clearly illustrating the patent. However, it should be appreciated that the number of views that can be displayed by this device is not limited to three but can be varied to produce different effects. One display might be designed specifically to show only three picture collages, while a different one might be provided with the ability to view 20 to 30 different views to display an animation or motion effect.

Figure 12:
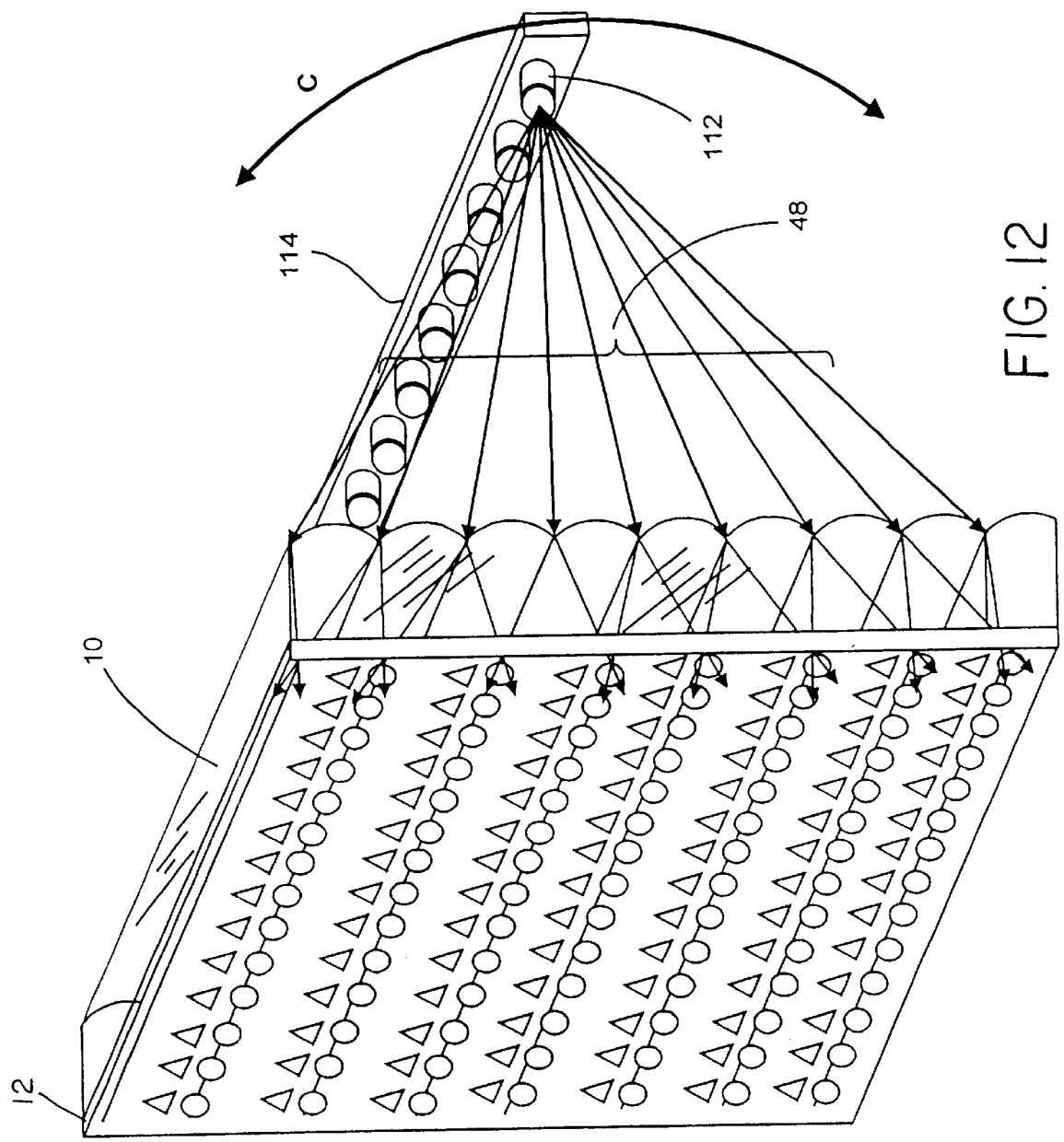
FIG. 12 depicts a backlit lenticular display device using a line illumination source.

Moving on to FIG. 12, which reveals further detail in the display device. In this Figure the lenticular image card consisting of the clear lenticular substrate and image bearing layer 12 shown in perspective. The point illumination source is now shown as an array of illumination sources mounted on a support 114. Emanating from one of the illumination sources 112 is the diverging rays of light 48 which are directed to the lenticule side of the lenticular substrate 10. The diverging rays are focused by each of the lenticules down onto the particular image view that corresponds to the selected viewing angle, in this case the circle image data. The illumination of the selected image view then radiates out in the viewers direction. The use of a line source of illumination 112 provides for more uniform illumination across each image view line, and consequentially provides much greater illumination for the whole display. The illumination source 112 is shown with the capability of translating through all viewing angles by its movement in the direction of arrow C. The individual illumination source 112 could be of any suitable type available today and could include LEDs, filament lamps or fiber optic bundles. It should be appreciated that the illumination source 112 although shown as an array of individual sources of illumination could be replaced directly with a line illumination source such as fluorescent tube or long filament lamp or any illumination source whose characteristics fulfill the requirements of the backlighted display device as set forth.

Figure 13:
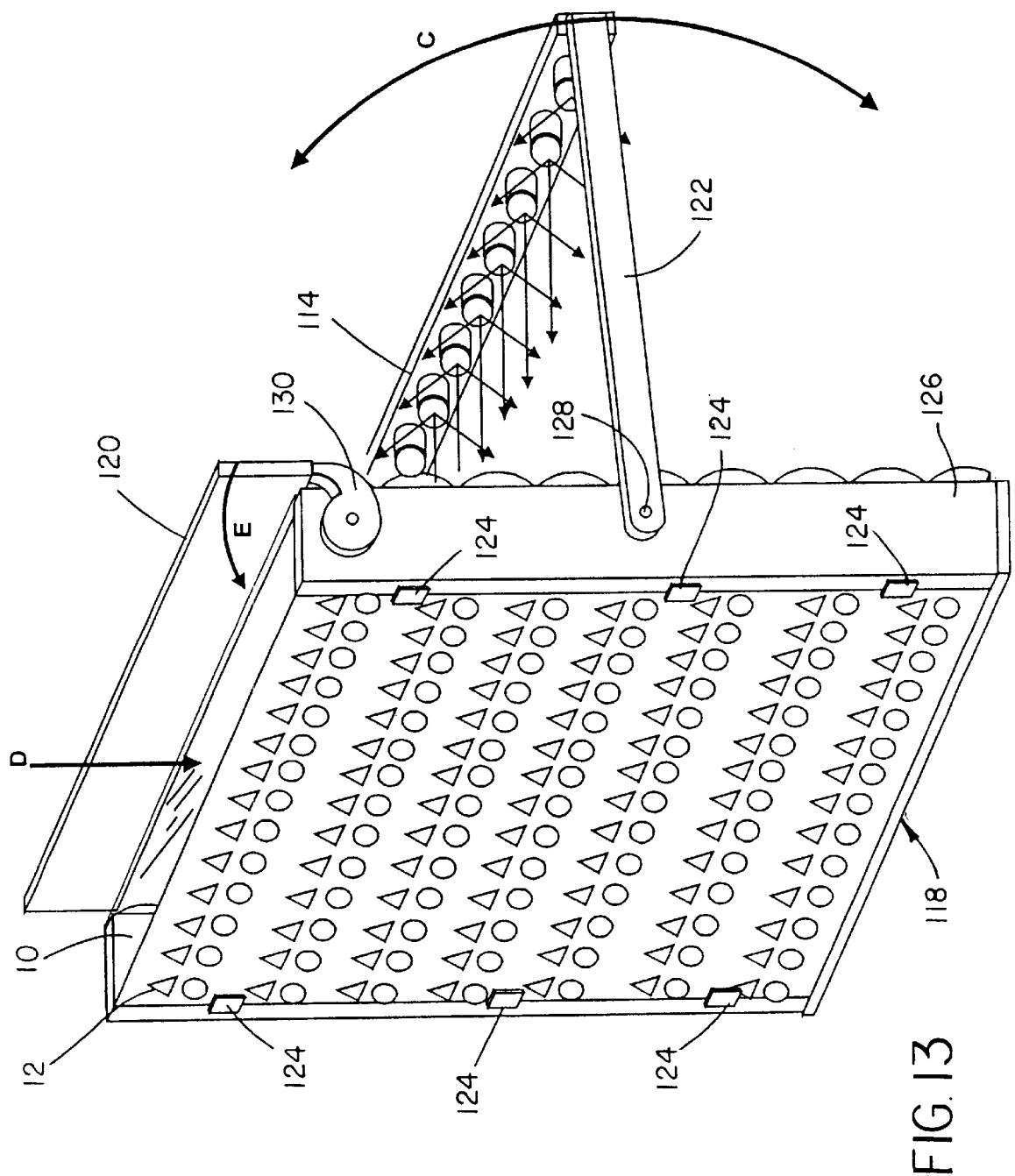
FIG. 13 is a perspective view of a backlit lenticular display device which provides the capability for replaceable lenticular image cards and for quickly changing from one lenticular image card to another.

Additional features of the display device are illustrated in FIG. 13. The backlighted display device 118 is shown as having the ability to readily exchange lenticular image cards for viewing. The display device pictured in FIG. 13, while greatly simplified, shows the basic elements of the invention. Also, it should be appreciated that the overall size and scale of the individual aspects of the elements are not correct, particularly the thickness and size of the lenticules on the lenticular substrate with respect to the overall display size. This was done in order to remain consistent with previous illustrations.

The main body or frame 126 of the display is shown onto which is mounted a pivoted support lever 122 which holds the line illumination source at the correct viewing distance for the lenticular image. A second pivoted support lever, not shown in the figure, is supplied on the opposite side to support the other end of the line illumination source. The lenticular image, as previously described, being composed of the lenticular substrate 10 and image bearing layer 12. The pivoted support levers provide for the movement of the line illumination source 112, through all viewing angles of the lenticular image as it moves in the direction of arrow C. In addition, a flip up door 120, on the top of the display device allows for a lenticular image to be placed in the display by sliding the lenticular image card through the door in the direction D. The flip up door is supported by two hinges on both sides of the frame. The visible hinge 130, is shown mounting to frame 126 on a pivot 128. Along the front edges of the display are retaining tabs 124 which hold the lenticular image card in the display. Additionally, some retaining mechanism would be required to constrain the lenticular image card on the lenticule side also, but this is not shown. This could be a transparent glass or plastic window which is mounted securely to the display frame. Although not specifically shown in FIG. 13, a plastic or glass cover on the front side of the display would also be desirable for protection of the lenticular image in the display.

Figure 14:
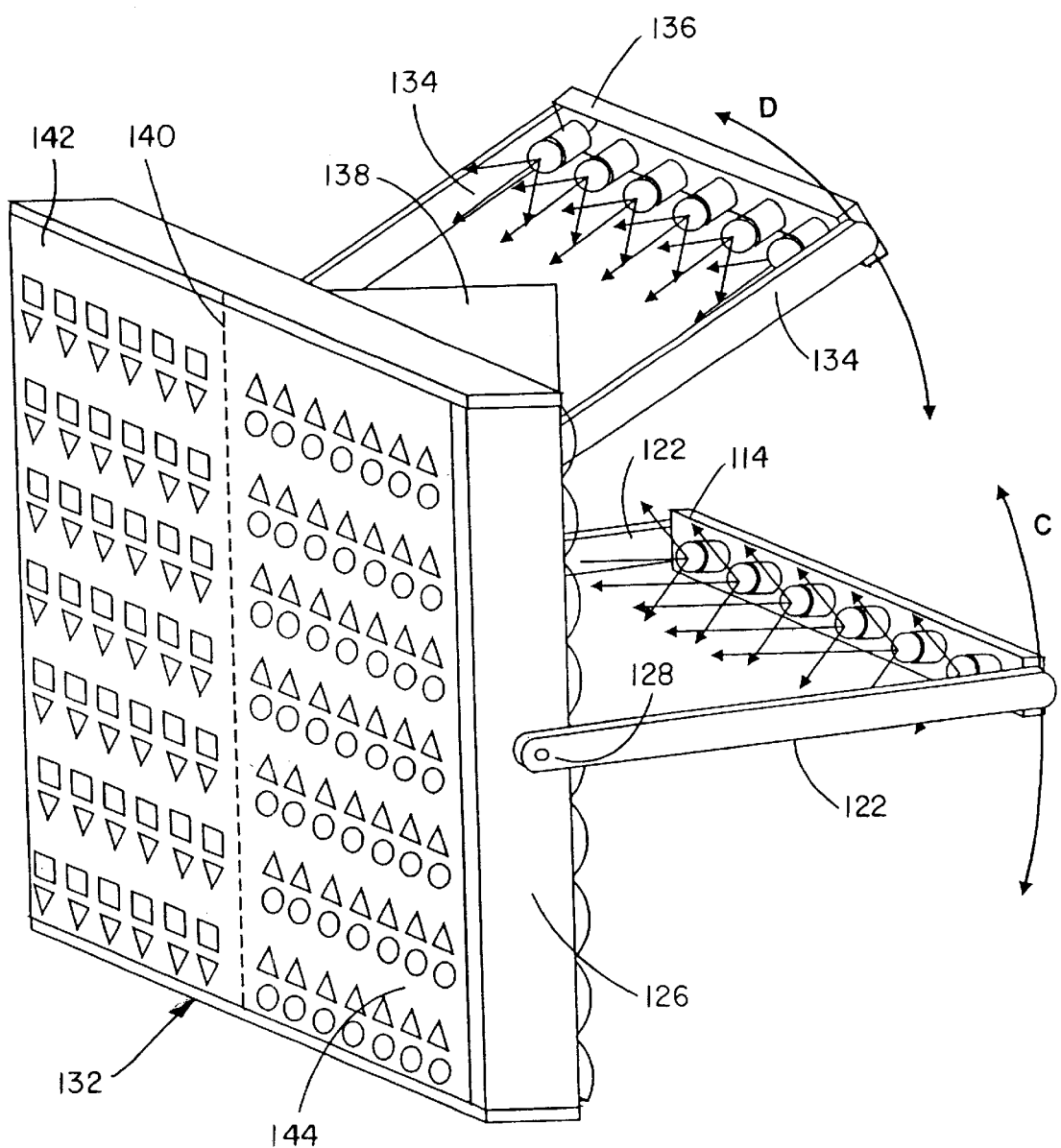
FIG. 14 illustrates a backlit lenticular display device having two zones of illumination that can illuminate different viewing angles.

Another enhancement to the display device is illustrated in FIG. 14 showing the display with two separate line illumination sources which can individually be moved to different viewing angles. This enhancement produces a display with two different illumination zones that provides for useful display characteristics. In this embodiment, the outer display frame 126 is similar to the preceding figure. Likewise, the line illumination source 112 is depicted being supported by the support levers 122 that holds the line illumination source 112 at the correct viewing distance and allows movement in the direction of arrow C. However, in this concept, the length of the line illumination source is only half the width of the lenticular image card. The other half of the lenticular image card is illuminated with a different line illumination source 136, that has its own support layer 134 which can be moved through all viewing angles in the direction of arrow D.

In between the separate line illumination sources is partition 138 that provides the pivot point and support for the inner lever support arms for line illumination sources 136 and 112. In addition, partition 138 also acts as a baffle that divides the lenticular image card in half confining the illumination from each line illumination source to its half of the display. The image views on the lenticular image are also divided into halves as shown, half 142 and half 144 with the dividing center line 140 at the position of the partition 138.

Each half of the lenticular image card has separate distinct picture information. The left half is shown figuratively with image information consisting of squares and inverted triangles, while the right half has image information figuratively represented by triangles and circles. As each of the left and right line illumination sources are moved through various viewing angles, the various image views of each half of the lenticular image will become visible. The benefit provided by this arrangement is that each line illumination source can be moved independent of the other. As and example, the left half of the lenticular image card may be an animated motion sequence and the right half of the card a set of separate images which could contain text. The left line illumination source is moved continually back and forth through all viewing angles to generate the continuous animation sequence on the left of the lenticular image card. At the same time the right line illumination source is moved at a different rate to sequentially display the textual information in the image views on the right side of the lenticular image card. This type of display could be applied towards advertising displays.

Figure 15:
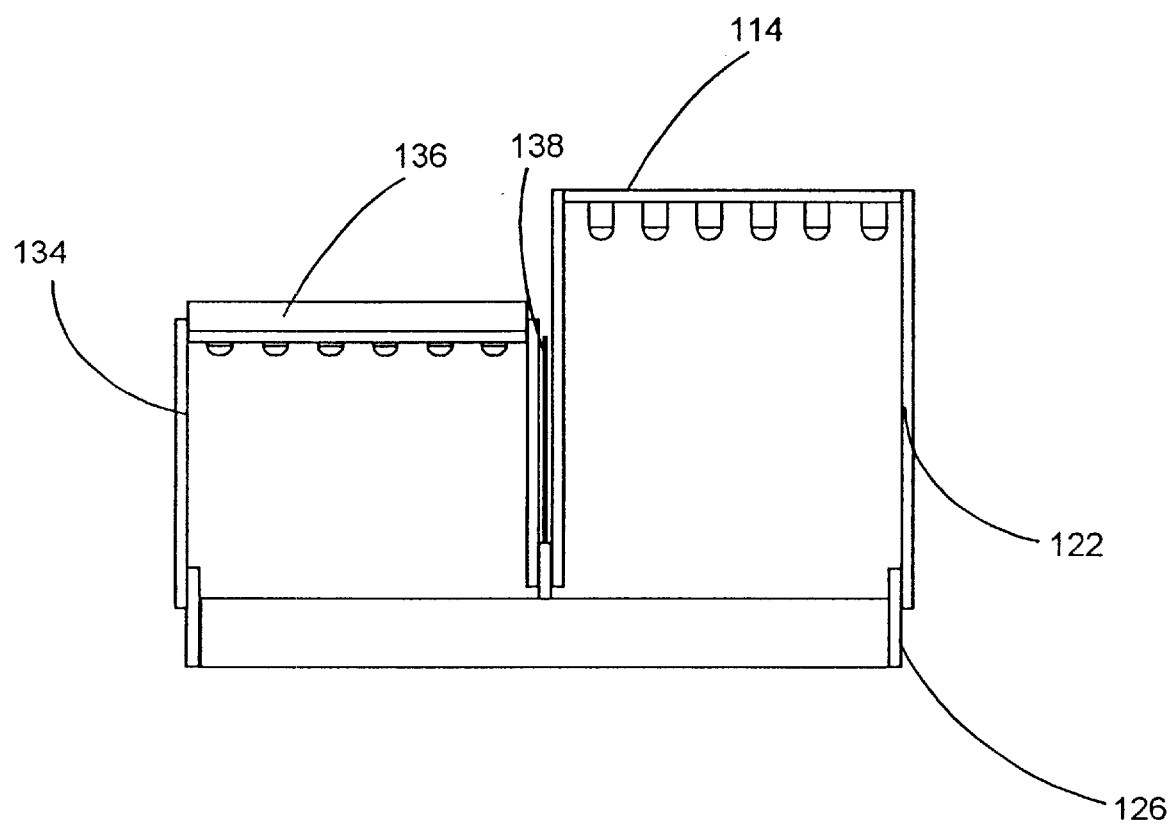
FIG. 15 is a top plan view the backlit lenticular display device of FIG. 14.

Further clarification of this display concept is provided by FIG. 15 which illustrates the two zone display device as seen from the top. The mechanisms of the two line illumination sources 136 and 112 can be clearly seen from this top view, where line illumination source 136 is raised to a higher position than 112. The partition 138 separating the two zones is also visible with the detail of the pivots for the support layers 134 and 122.

In addition to the elements illustrated in the preceding figures there are many other components that would be needed to complete the display device. In particular, an enclosure around the display and a means of controlling power to the illumination sources as well as a means of moving them through the viewing angles. The actual means used to move the line illumination sources could include any and all available types of mechanical displacement devices know in the art. Some examples of these devices will include: cams, pulleys, linear slides and lead screws. The actual motive force input to the mechanisms can be electric motors, solenoids and manual push pull actuators.

The display as shown in FIGS. 14 and 15 provides two zone lenticular image viewing, but this is meant only as an example for the purpose of illustration. Display devices can use this principal to create multi zone illumination displays and with the proper illumination can provide upper and lower illumination zones.

While the preceding discussion has used the example of a moving line illumination source to provide illumination through the different viewing angles, it is clear that these display devices can use the alternate methods of illumination that are taught in this patent.

Figure 16A:
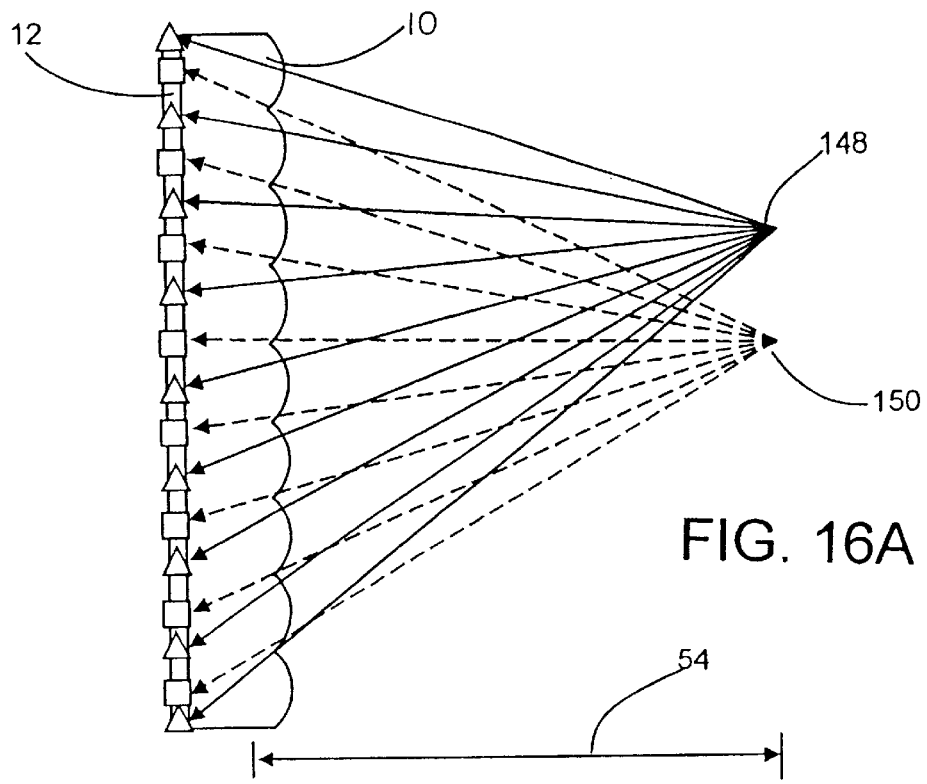
FIGS. 16A and 16B are schematic views showing the viewing distance of a lenticular image can placed at infinity and how the image views are illuminated.
Figure 16B:
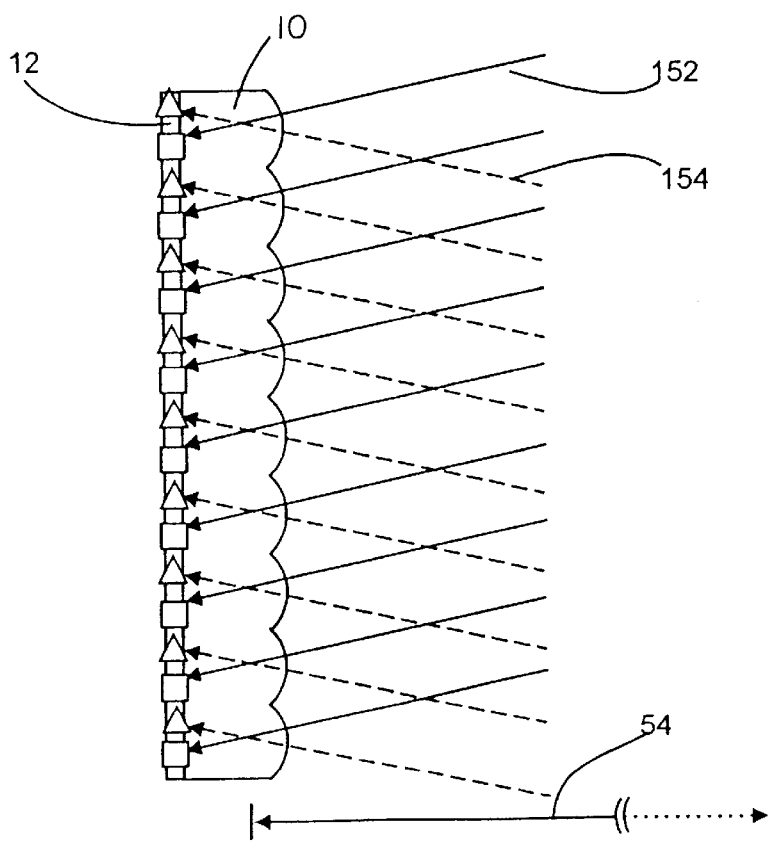

Another illumination method will now be described using FIGS. 16A and 16B. FIG. 16A, for comparative purposes again illustrates a cone of divergent illumination at position 148, which is at the correct viewing distance 54 for the lenticular image. The lenticular image is composed of clear lenticular substrate 10 and image bearing layer 12 and having image information figuratively shown as triangles and squares at two different sets of image views. The illumination when directed towards and through the lenticules of a lenticular image will have the illumination converge onto a set of image views corresponding to the viewing angle of the illumination source. A second illumination source at position 150 also at the correct viewing distance 54, will have its divergent rays of illumination converge on a second set of views corresponding to the viewing angle of the illumination.

It has already been described how the viewing distance of a lenticular image can be determined by controlling the image magnification relative to the pitch of the lenticules on the lenticular substrate. FIG. 16B shows a lenticular image which has been created to have a viewing distance 54 at infinity. In this case the only way to properly illuminate a given set of image views is to provide an illumination source that is effectively located at an infinite distance from the lenticules on the lenticular substrate. When illuminated in this way the rays from the illumination source will no longer diverge but will be parallel rays. One of the rays 152, of a set of parallel rays, is shown as solid lines and proceeds from an illumination source at an infinite distance to the right at some angle. A second ray 154, of a set of parallel rays, shown as dashed lines, proceeds from an illumination source at an infinite distance to the right and is at a different angle. As each set of illumination rays enters the lenticules of the lenticular image at different viewing angles, they each selectively illuminate a different set of image views.

Figure 17:
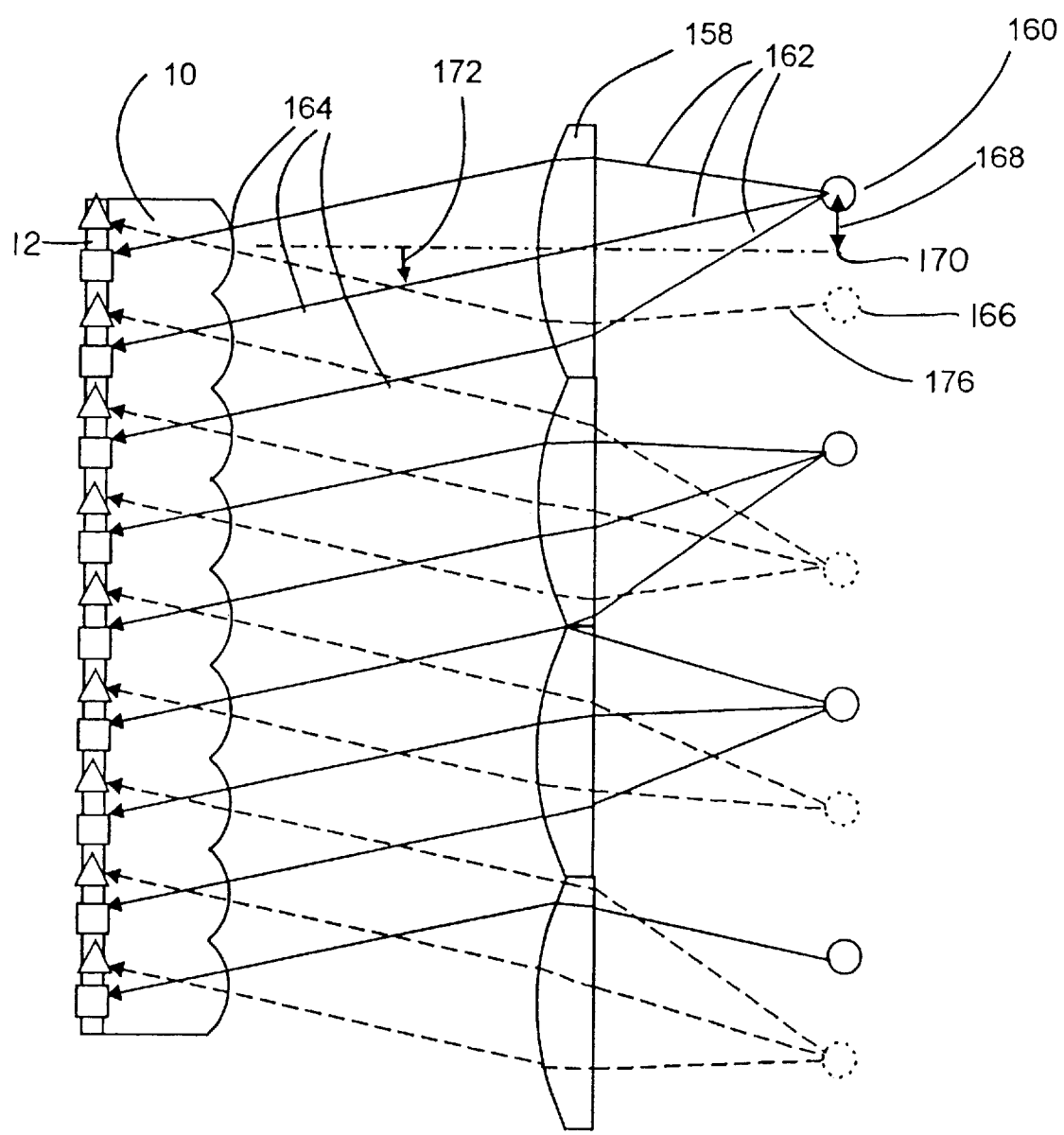
FIG. 17 is a schematic view of an embodiment with an illumination source which can be used to provide the proper illumination to a lenticular image that has a viewing distance at infinity.

FIG. 17 illustrates an embodiment for an illumination source effectively located at infinity which has the ability to change the projected viewing angles of the parallel rays. Once again, the lenticular image consisting of lenticular substrate 10 and image bearing layer 12 are shown with image information on the image bearing layer 12 whose magnification produces a viewing distance at infinity. The illumination source consists of an array of cylinder lenses wherein the top cylinder lens 158 of the array is shown for reference. Since the features and operation of all the cylinder lenses are the same, a description of cylinder lens 158 will suffice. It should be understood that the long axis of the cylinder lens 158 and the cylinder lens array is oriented perpendicular to the plane of the figure. Behind cylinder lens 158 located at its back focal plane is an illumination source 160. Illumination source 160 is shown as a point source but in fact illumination source 160 is a line source whose line is parallel to the long axis of cylinder lens 158. Divergent illumination rays 162 from illumination 160 will pass through cylinder lens 158 and emerge from the other lens surface collimated as parallel rays 164. The angle 172 of the collimated rays of illumination is determined by the vertical position 168 relative to the center line 170 of the cylinder lens. The parallel rays 164 of the illumination source 160 then enter the lenticules of the clear lenticular substrate 10 and impinge on image bearing layer 12 to illuminate the set of image views pertaining to the square image information.

As the vertical position of illumination source 160 at the back focal plane of cylinder lens 158 changes with respect to the center line 170, the angle 172 of the illumination rays emanating from the cylinder lens 158 will change. A second similar illumination source 166 is shown at a different vertical position at the back focal plane of cylinder lens 158. For clarity the second illumination source 166 is shown as a dashed circle and the illumination rays 176 diverging from it are also dashed. The vertical position of the second illumination source 166 on the back focal plane of cylinder lens 158 is on the opposite side of the center line 170 of the cylinder lens 158 and therefore the angle of the parallel rays of illumination from this illumination source is also opposite. Hence, by either moving the first illumination source 160 to the location of illumination source 166 or by utilizing separate illumination sources and alternately turning each on separately, parallel rays of illumination emanating from the cylinder lens can be produced at different viewing angles. By repeating this arrangement for all the cylinder lenses in the array, individual image view sets of the whole lenticular image can be selectively illuminated for viewing.

It can be appreciated that while the above description has shown only two illumination sources for illuminating two image views, the intent is to convey the principal of multiple image view illumination with this method. Therefore this display in practice will contain the capability to display whatever number of views is desired.

PARTS LIST

2. Lenticule
4. Front surface
6. Back surface
8. Diffusive reflective layer
10. Lenticular substrate
12. Image bearing layer
14. Diffuse ambient light
16. Diffuse ambient light
18. Lenticular lenses
20. Triangle image point
22. Collimated beam
26. Image point
28. Distance
30. Circle
32. Circle image data
34. Image location
36. Triangle
38. Triangle image data
40. Location
42. Square
44. Square image data
46. Location
48. Rays of light
50. Viewer's eye
52. Rays
54. Viewing distance
56. Point source of illumination
58. Lenticule center lines
60. Upper section
62. Lenticular image card
64. Middle section
66. Square image data
68. Lower section
70. Lenticular image center line
72. Viewing angle
74. Image views
76. Angle
80. Rays
84. Rays
86. Divergent rays
88. Divergent rays
90. Emerging rays
94. Illumination source
96. Square
98. Triangle
102. Circle
106. Square
108. Triangle
110. Circle
112. Illumination source
114. Support
118. Backlit display device
120. Flip up door
122. Support lever
124. Retaining tabs
126. Frame
128. Pivot
130. Visible hinge
134. Support layer
136. Illumination source
138. Partition
140. Center line
142. Half
144. Half
148. Position
150. Position
152. Ray
154. Ray
158. Cylinder lens
160. Illumination source
162. Illumination rays
164. Parallel rays
166. Illumination source
168. Vertical position
170. Center line
172. Angle
176. Illumination rays

What is claimed is:

1. A method of selectively illuminating an image of a set of images formed on an image bearing layer of a lenticular image comprising the steps of:

providing an array of line illumination sources;

projecting light from said array of line illumination sources through a linear array of cylinder lenses;

wherein said array of line illumination sources are at a back focal plane of said linear array of cylinder lenses and at an identical vertical position relative to a central axis of each of said cylinder lenses to effectively produce a plane illumination source at an infinity;

projecting light from said illumination sources through a lenticule side of said lenticular image;

passing said light through lenticules on said lenticular image such that rays of said illumination source emanate from a point located at a viewing distance of said lenticular image;

locating said illumination source such that an angle formed by a ray from said illumination source relative to a line located at a center of said lenticular image and normal to an image plane corresponds to a correct viewing angle of a first image;

wherein said source of illumination is a line source parallel to a longitudinal axes of said lenticules; and changing said vertical position of each line illumination source of said array of line illumination sources at said back focal plane of each cylinder lens of said array of cylinder lenses relative to said center axis of each of said cylinder lens to change said angle of illumination transmitted by said cylinder lens thereby generating said viewing angles of said set of images.

2. The method of claim 1, wherein each of said plurality of line illumination sources is located at different equally spaced vertical positions relative to said center axis of each of said cylinder lenses, thereby generating said viewing angles corresponding to each image of said set of images; and selectively energizing and de-energizing one line illumination source behind each of said cylinder lenses, one at a time, to selectively illuminate one image from said set of images.

3. The method of claim 2, wherein the number of line illumination sources placed at the back focal plane and located at different vertical positions relative to the center axis of each cylinder lens of said array of cylinder lenses is equal to or greater than the number of image views in said set of images.

4. An apparatus for selectively illuminating an image in a first plurality of images formed on a first region of an image bearing layer of a first lenticular image comprising:

a first source of illumination which projects light on said first region of a lenticules side of said lenticular image;

wherein of said first illumination source emanate from a point located at a viewing distance of said first lenticular image;

wherein an angle formed by a ray from said first illumination source is relative to a line located at a center of said lenticular image and normal to an image plane corresponding to a correct viewing angle of a first image of said first plurality of images;

wherein said first source of illumination is a line source parallel to a longitudinal axes of said lenticules; and further comprising a slot for removing said first lenticular and insertion of a second lenticular image.

5. The apparatus of claim 4, further comprising a second source of illumination which illuminates a second region of said lenticular image comprising a second plurality of images wherein each of said first and second regions are selectively and independently illuminated.

* * * * *